(12) United States Patent
Weist, Jr. et al.

(10) Patent No.: US 9,381,460 B2
(45) Date of Patent: Jul. 5, 2016

(54) PRESSURE SWING ADSORPTION PROCESS

(71) Applicant: AIR PRODUCTS AND CHEMICALS, INC., Allentown, PA (US)

(72) Inventors: Edward Landis Weist, Jr., Macungie, PA (US); Dingjun Wu, Macungie, PA (US); Jianguo Xu, Wrightstown, PA (US); Blaine Edward Herb, New Tripoli, PA (US); Bryan Clair Hoke, Jr., Bethlehem, PA (US)

(73) Assignee: AIR PRODUCTS AND CHEMICALS, INC., Allentown, PA (US)

( * ) Notice: Subject to any disclaimer, the term of this patent is extended or adjusted under 35 U.S.C. 154(b) by 30 days.

(21) Appl. No.: 14/483,240

(22) Filed: Sep. 11, 2014

(65) Prior Publication Data
US 2014/0373713 A1 Dec. 25, 2014

(51) Int. Cl.
*B01D 53/047* (2006.01)
*C01B 3/56* (2006.01)

(52) U.S. Cl.
CPC ............ *B01D 53/047* (2013.01); *C01B 3/56* (2013.01); *B01D 2256/10* (2013.01); *B01D 2256/16* (2013.01); *B01D 2256/18* (2013.01); *B01D 2257/40* (2013.01); *B01D 2257/502* (2013.01); *B01D 2257/504* (2013.01); *B01D 2257/7025* (2013.01); *B01D 2259/40041* (2013.01); *B01D 2259/4068* (2013.01); *C01B 2203/043* (2013.01); *Y02C 10/08* (2013.01); *Y02C 20/20* (2013.01); *Y02P 20/152* (2015.11); *Y02P 20/156* (2015.11)

(58) Field of Classification Search
CPC ............ B01D 53/047; B01D 2256/10; B01D 2256/16; B01D 2256/18; B01D 2257/40; B01D 2257/502; B01D 2257/504; B01D 2257/7025; B01D 2259/40041; B01D 2259/4068; C01B 3/56; C01B 2203/043
USPC .............. 95/96–100, 103, 139, 140, 130, 143
See application file for complete search history.

(56) References Cited

U.S. PATENT DOCUMENTS

| 3,430,418 A | 3/1969 | Wagner |
| 3,986,849 A | 10/1976 | Fuderer et al. |
| 4,375,363 A * | 3/1983 | Fuderer ............... B01D 53/047 252/373 |
| 4,783,203 A | 11/1988 | Doshi |
| 4,816,039 A | 3/1989 | Krishnamurthy et al. |
| 4,846,851 A | 7/1989 | Guro et al. |

(Continued)

FOREIGN PATENT DOCUMENTS

| DE | 195 06 762 C1 | 1/1996 |
| DE | 19506762 C1 | 1/1996 |

(Continued)

OTHER PUBLICATIONS

Yoshida, et al., Simulation of an Enriching Reflux PSA Process with Parallel Equalization for Concentrating a Trace Component in Air, Ind. Eng. Chem. res., 2006, pp. 6243-6250, vol. 45, American Chemical Society.

(Continued)

*Primary Examiner* — Frank Lawrence
(74) *Attorney, Agent, or Firm* — Bryan C. Hoke, Jr.

(57) ABSTRACT

A pressure swing adsorption process for an adsorption system having 12 adsorption beds, the process having a cycle with 5 pressure equalization steps. Background is provided for the various pressure swing adsorption cycle steps.

12 Claims, 23 Drawing Sheets

(56) References Cited

U.S. PATENT DOCUMENTS

| | | |
|---|---|---|
| 4,914,218 A | 4/1990 | Kumar et al. |
| 5,082,474 A | 1/1992 | Shirley et al. |
| 5,232,473 A | 8/1993 | Kapoor et al. |
| 5,254,154 A | 10/1993 | Gauthier et al. |
| 5,294,247 A | 3/1994 | Scharpf |
| 5,536,299 A | 7/1996 | Girard et al. |
| 6,007,606 A | 12/1999 | Baksh et al. |
| 6,063,161 A | 5/2000 | Keefer et al. |
| 6,210,466 B1 | 4/2001 | Whysall et al. |
| 6,379,431 B1 | 4/2002 | Xu et al. |
| 6,565,628 B2 | 5/2003 | Xu et al. |
| 6,585,804 B2 | 7/2003 | Kleinberg et al. |
| 7,179,324 B2 | 2/2007 | Baksh et al. |
| 7,255,727 B2 | 8/2007 | Monereau et al. |
| 7,294,172 B2 | 11/2007 | Baksh et al. |
| 7,306,651 B2 | 12/2007 | Cieutat et al. |
| 7,396,387 B2 | 7/2008 | Baksh et al. |
| 7,399,341 B2 | 7/2008 | Patel et al. |
| 7,404,846 B2 | 7/2008 | Golden et al. |
| 7,537,742 B2 | 5/2009 | Baksh et al. |
| 7,550,030 B2 | 6/2009 | Kumar |
| 8,394,171 B2 | 3/2013 | Elseviers et al. |
| 8,435,328 B2 | 5/2013 | Baksh et al. |
| 8,491,704 B2 | 7/2013 | Baksh et al. |
| 8,496,733 B2 | 7/2013 | Baksh et al. |
| 8,545,601 B2 | 10/2013 | Song |
| 8,551,217 B2 | 10/2013 | Baksh et al. |
| 2003/0015091 A1 | 1/2003 | Xu et al. |
| 2005/0098034 A1 | 5/2005 | Gittleman et al. |
| 2005/0257685 A1 | 11/2005 | Baksh et al. |
| 2005/0268780 A1 | 12/2005 | Sumida et al. |
| 2009/0223371 A1 | 9/2009 | Nakao et al. |
| 2010/0107688 A1 | 5/2010 | Kohlberger et al. |
| 2012/0174775 A1 | 7/2012 | Baksh et al. |
| 2012/0174776 A1 | 7/2012 | Baksh et al. |
| 2012/0174777 A1 | 7/2012 | Baksh et al. |
| 2013/0239807 A1 | 9/2013 | Weist, Jr. et al. |

FOREIGN PATENT DOCUMENTS

| | | |
|---|---|---|
| EP | 0722764 A2 | 7/1996 |
| EP | 1228799 A1 | 7/2002 |
| EP | 1 228 799 A1 | 8/2002 |
| EP | 1486245 B1 | 2/2009 |

OTHER PUBLICATIONS

Grande, Advances in Pressure Swing Adsorption of Gas Separations, International Scholarly Research Network Chemical Engineering, 2012, pp. 1-13, vol. 2012.

Reynolds, Stripping PSA Cycles for CO2 Recovery from Flue Gas at High Temperature Using a Hydrotalcite-Like Adsorbent, Ind. Eng. Chem. Res., 2006, pp. 4278-4294, vol. 45, American Chemical Society.

Mehrotra, et al., Arithmetic Approach for Complex PSA Cycle Scheduling, Adsorption, 2010, pp. 113-126, vol. 16, Springer Science+Business Media.

Kumar, et al., A New Concept to Increase Recovery from H2 PSA: Processing Different Pressure Feed Streams in a Single Unit, Gas. Sep. Purif., 1995, pp. 271-276, vol. 9, Elsevier Science, Great Britain.

* cited by examiner

FIG. 3 (Prior Art)

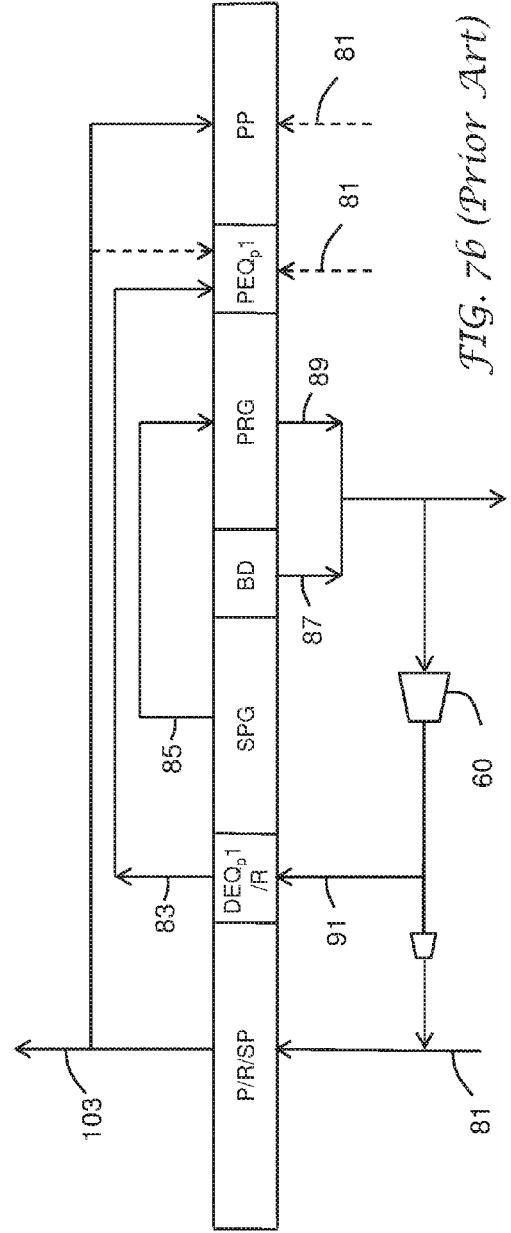

| 1 | 2 | 3 | 4 | 5 | 6 | 7 | 8 | 9 | 10 | 11 | 12 |
|---|---|---|---|---|---|---|---|---|---|---|---|
| P1 | P2 | P3 | DEQ1 | SPG | DEQ2 | BD | PRG | PEQ2 | PEQ1 | PP1 | PP2 |
| BD | PRG | PEQ2 | PEQ1 | PP1 | PP2 | P1 | P2 | P3 | DEQ1 | SPG | DEQ2 |
| DEQ1 | SPG | DEQ2 | BD | PRG | PEQ2 | PEQ1 | PP1 | PP2 | P1 | P2 | P3 |
| PEQ1 | PP1 | PP2 | P1 | P2 | P3 | DEQ1 | SPG | DEQ2 | BD | PRG | PEQ2 |

FIG. 16a (Prior Art)

| P | PRG | PEQ2 | PEQ1 | SPG | DEQ2 | BD | PRG | PEQ2 | PEQ1 | SPG | DEQ2 |
|---|---|---|---|---|---|---|---|---|---|---|---|
| BD | PRG | PEQ2 | PEQ1 | SPG | DEQ2 | BD | PRG | PEQ2 | PEQ1 | SPG | DEQ2 |
| DEQ1 | SPG | DEQ2 | BD | PRG | PEQ2 | PEQ1 | P | PP | DEQ1 | P | PEQ2 |
| PEQ1 | PP | | BD | P | PEQ1 | P | PP | DEQ2 | BD | PRG | PEQ2 |

PRESSURE SWING ADSORPTION PROCESS

BACKGROUND

This invention relates to pressure swing adsorption (PSA) processes, and more particularly to such processes employing multiple adsorbent beds.

PSA processes are well-known for the separation of gas mixtures that contain components with different adsorbing characteristics. The pressure swing adsorption process may be used for separating a primary gas component from a feed gas mixture comprising the primary gas component and one or more secondary gas components. The primary gas component may be $H_2$ and the secondary gas components may be gases such as $N_2$, CO, $CO_2$, and $CH_4$, such as a reformate from a steam methane reformer or other hydrocarbon reforming process. The primary gas component may be $H_2$ and the secondary gas components may be gases such as $CH_4$, $C_2H_6$, $C_3H_8$, and/or higher alkanes, alkenes, and aromatics associated with refinery off gas streams. The primary gas component may be He and the secondary gas components may be gases such as $N_2$, $CH_4$, CO, and/or $CO_2$. The primary gas component may be $N_2$ and the secondary gas components may be gases such as $C_2H_4$, $C_2H_6$, $C_3H_6$, and/or $C_4H_8$.

Hydrogen production via pressure swing adsorption ($H_2$ PSA) is an established industry practice for supplying high purity hydrogen for petroleum refiners, chemical producing industries, metals refining, and other related industries. The feed gas mixture may be a reformate from a steam-hydrocarbon reforming process or an autothermal reforming process. The reformate may have been shifted in a shift reactor. The feed gas mixture may be a properly treated effluent stream from a gasification unit.

In a typical PSA system, a multicomponent gas is passed to at least one of multiple adsorption beds at an elevated pressure to adsorb at least one strongly sorbed component while at least one component passes through the adsorption bed. In the case of $H_2$ PSA, $H_2$ is the most weakly adsorbed component and passes through the adsorption bed.

Industry desires to reduce compression requirements for PSA cycles.

Industry desires improved PSA processes and cycles which increase $H_2$ production and/or $H_2$ recovery in a multiple bed system.

Industry desires improved PSA processes and cycles that reduce capital and/or operating costs to produce hydrogen.

Pressure swing adsorption cycles comprise a number of well-known steps. The skilled person can combine the known steps in any suitable manner to achieve desired objectives. Determining a suitable combination of known steps follows rules known in the art and computer programs are available to assist with development and evaluation of any combination of known steps. Furthermore, many suitable pressure swing adsorption cycles are known and published, and modification of those known cycles with other well-known steps is straightforward and can be readily evaluated.

For example Mehrotra et al. in a paper titled "Arithmetic approach for complex PSA cycle scheduling," *Adsorption* (2010) 16: 113-126, incorporated herein by reference, describe an algebraic model derived for obtaining complex pressure swing adsorption cycle schedules. The approach uses a priori specified cycle steps, their sequence and any constraints, and then solving a set of analytical equations. The solution identifies all the cycle schedules for a given number of beds, the minimum number of beds required to operate the specified cycle step sequence, the minimum number and location of idle steps to ensure alignment of coupled cycle steps, and a simple screening technique to aid in identifying the best performing cycles that deserve further examination. Overall, the methodology for complex PSA cycle scheduling can be applied to any number of cycle steps, any corresponding cycle step sequence, and any number of constraints, with the outcome being the complete set of cycle schedules for any number of beds greater than or equal to the minimum number it determines.

As pressure swing adsorption (PSA) processes are well-known, one of ordinary skill in the art can construct an adsorption system suitable for carrying out the process described herein. Suitable equipment for carrying out the process is well-known in the art. Operating conditions not specifically disclosed herein that are suitable for use in the process described herein may be determined by one skilled in the art without undue experimentation.

The process may be carried out in axial adsorbent beds or radial adsorbent beds.

Number of Beds

Pressure swing adsorption processes are carried out in adsorption beds. Any suitable number of adsorption beds may be used. In general, the PSA process is designed to meet required product purity and $H_2$ product recovery.

For a required product purity, the number of beds can be a trade-off between capital and hydrogen recovery. For example, increasing the number of beds allows the PSA process to utilize a greater number of pressure equalization steps. Pressure equalization steps are hydrogen saving steps. Increasing the number will reduce the pressure at which gas is discharged from the bed to the waste stream, decreasing hydrogen losses. If the pressure equalization steps are conducted through co-current depressurization of the high pressure bed, the impurity front advances farther when more pressure equalization steps are used. To maintain the desired production, the size of each bed increases in addition to the number of beds.

Alternatively, the number of beds may be increased to lengthen the time available to individual steps that may be limiting the efficiency of the overall process. For example, increasing the number of beds allows the PSA process to increase the number of beds that will process feed gas or process purge gas. Sending gas to more beds on feed or more beds on purge decreases the velocity of the gas passing over the adsorbent particles, which in turn increases the efficiency of the process step.

Generally more than one adsorption bed is used so that at least one adsorption bed can be producing product gas while another bed is regenerating. In this way, product gas can be produced on a continuous basis.

The skilled person can readily select the number of adsorption beds to use.

Number of Adsorbents

The adsorption beds may contain a single adsorbent or multiple adsorbents. In the case of multiple adsorbents, the adsorbents may be interspersed, layered, or a combination thereof. Adsorbent beds may comprise multiple layers as described, for example, in U.S. Pat. No. 7,179,324, incorporated herein by reference.

Suitable adsorbents may be readily selected by those skilled in the art. Activated alumina, silica gel, activated carbon, molecular sieves, and naturally occurring zeolites are common.

FIG. 1 shows a schematic of an example adsorption system with adsorption beds 10A, 20A, 30A, 40A, 50A, 10B, 20B, 30B, 40B, and 50B, suitable for the PSA process. An adsorption system may be constructed with pairs, or other multiples of beds, operating in parallel (i.e. on the same step). For example adsorption beds 10A and 10B could be configured to always be on the same step, adsorption beds 20A and 20B on the same step, etc. Alternatively, an adsorption system may be constructed without beds operating in parallel.

An adsorption bed is a grouping of adsorption material which undergoes each of the cycle steps contemporaneously. An adsorption bed may be contained in a single containment vessel or contained within multiple containment vessels. For example, with reference to the 4 bed cycle in FIGS. 2a/2b, and the adsorption system schematic in FIG. 1, all of the adsorption material in adsorption bed 10A undergoes the production step (P) contemporaneously, then all of the adsorption material in adsorption bed 10A undergoes the production/supply product step (P/SP) contemporaneously, then all of the adsorption material in adsorption bed 10A undergoes the first pressure decreasing equalization (DEQ1) step contemporaneously, then all of the adsorption material in adsorption bed 10A undergoes the supply purge (SPG) step contemporaneously, then all of the adsorption material in adsorption bed 10A undergoes the blowdown (BD) step contemporaneously, then all of the adsorption material in adsorption bed 10A undergoes the purge step (PRG) contemporaneously, then all of the adsorption material in adsorption bed 10A undergoes the first pressure increasing equalization step (PEQ1) step contemporaneously, then all of the adsorption material in adsorption bed 10A undergoes the product pressurization (PP) step contemporaneously.

Various known PSA cycle steps are described below. The length of a step may be quantized (discretized) (i.e. an integer number of cycle time segments). However the step may be a fractional value of a cycle time segment with the balance as an idle step as shown in FIG. 3. Furthermore the steps do not need to align with each other exactly as shown in FIG. 3. In FIG. 3, for example, the timing of the change from the SPG step to BD step does not align with the timing of the change from the $DEQ_p2$ step to $DEQ_p3$ step.

The cycle time of the PSA cycle is the length of time when the feed gas mixture is first conducted to the first bed in the repetitive cycle to the time when the gaseous mixture is again first conducted to the first bed in the cycle immediately following.

Production Step (P)

The production step is abbreviated herein as "P". The production step is also called the feed step and/or adsorption step in the literature. While this step is sometimes referred to as the feed step and/or adsorption step, the term "production step" is used herein instead of "feed step" since it is possible to have feed introduced into an adsorption bed without a product gas being produced, and the term "adsorption step" is not used because adsorption and desorption are occurring in many of the different steps.

The production step comprises introducing a feed gas mixture (e.g. a reformate) at a feed gas pressure into an adsorption bed undergoing the production step and adsorbing the secondary gas components (e.g. CO, $CO_2$, and/or $CH_4$) on the adsorbent in the adsorption bed undergoing the production step while simultaneously withdrawing a product gas (e.g. $H_2$ product gas) from the adsorption bed undergoing the production step. The product gas contains a higher concentration of the primary gas component than the feed gas mixture and is depleted of the secondary gas components. The duration of the production step may be any suitable duration, for example from 1 second to 300 seconds, or from 30 seconds to 300 seconds. The skilled person can readily determine a suitable duration for any of the known PSA cycle steps.

For hydrogen production the feed gas pressure may range, for example, from 0.5 MPa to 7.0 MPa or from 1.0 MPa to 3.6 MPa (absolute pressure).

The term "depleted" means having a lesser mole % concentration of the indicated gas than the original stream from which it was formed. "Depleted" does not mean that the stream is completely lacking the indicated gas. The product gas withdrawn during the feed step therefore has a higher mole % concentration of the primary gas component than the feed gas mixture due to adsorption of the secondary gas components on the adsorbent.

At the end of the production step, the adsorption bed contains what is called a void space gas which is a combination of both gas phase and adsorbed phase molecules. The void space gas has a higher average concentration of the more strongly adsorbable components than the feed gas mixture since the less adsorbable components were withdrawn as the product stream. The concentration of the various components of the void space gas mixture will generally vary as a function of distance from the feed end to the product end of the adsorption bed. The void space gas near the product end will generally have a higher concentration of weakly adsorbable components and non-adsorbable components. The void space gas near the feed end will generally have a higher concentration of the more strongly adsorbable components.

In terms of pressure, the bed pressure during the feed step is typically substantially maintained at a constant pressure that corresponds with the highest pressure ($P_H$) in the Pressure Swing Adsorption (PSA) cycle.

As shown in U.S. Pat. No. 7,179,324, it is possible to have a PSA cycle where there is a time segment where there are no beds in a production step or hybrid form thereof. It means that during this time segment, no product gas is being withdrawn from the PSA system.

Multiple production steps at different feed gas pressures are also known and can be incorporated by the skilled person if desired. Kumar et al., "A new concept to increase recovery from $H_2$ PSA: processing different pressure feed streams in a single unit," Gas Sep. Purif. Vol, 9, No. 4, pp. 271-276, 1995, incorporated herein by reference, discloses a PSA cycle with a low pressure production step and a high pressure production step. Three or more production step pressure levels are possible if desired.

Co-Current and Countercurrent

Each of the adsorption beds has a "feed end" and a "product end," so termed because of their function during the production step of the adsorption cycle. A feed gas mixture is introduced into the "feed end" of the adsorption bed and a product gas is withdrawn from the "product end" during the production step of the cycle. During other steps of the adsorption cycle, gas may be introduced or withdrawn from "feed end." Likewise, during other steps of the adsorption cycle, gas may be introduced or withdrawn from the "product end."

The direction of flow during other steps is typically described with reference to the direction of flow during the production step. Thus gas flow in the same direction as the gas flow during the production step is "co-current" (sometimes called "concurrent") and gas flow that is in the opposite direction to the gas flow during the production step is "counter-current." Co-currently introducing a gas into an adsorption bed means to introduce the gas in the same direction as the feed gas introduced during the production step (i.e. introducing into the feed end). Counter-currently introducing a gas into an adsorption bed means to introduce the gas in a direction opposite to the direction of the feed gas flow during the feed step (i.e. introducing into the product end). Co-currently withdrawing a gas from an adsorption bed means to withdraw the gas in the same direction as the product gas during the production step (i.e. withdrawing from the product end). Counter-currently withdrawing a gas from an adsorption bed means to withdraw the gas in a direction opposite to the direction of the product gas flow during the production step (i.e. withdrawing from the feed end).

Gas may be simultaneously co-currently introduced to the feed end and counter-currently introduced to the product end. Gas may be simultaneously co-currently withdrawn from product end and counter-currently withdrawn from the feed end. Gas may be simultaneously co-currently introduced into the feed end and co-currently withdrawn from the product end. Gas may be simultaneously counter-currently introduced to product end and counter-currently withdrawn from the feed end.

When gas is withdrawn from an intermediate position to the feed end and the product end, a portion of the gas is co-currently withdrawn and a portion of the gas is counter-currently withdrawn. When gas is introduced to an intermediate position to the feed end and the product end, a portion of the gas is co-currently introduced and a portion is counter-currently introduced.

Feed gas introduction and product gas withdrawal at intermediate positions of the adsorption bed is disclosed by Grande, "Advances in Pressure Swing Adsorption for Gas Separation," *International Scholarly Research Network Chemical Engineering*, Vol. 2012, Article ID 982934, 2012, incorporated herein by reference.

Production/No Feed Step (P/NF)

Kleinberg et al. (U.S. Pat. No. 6,585,804), incorporated herein by reference, discloses a step where product gas is produced without the introduction of feed gas to the adsorption bed. This step is abbreviated herein as "P/NF." This step generally follows a production step and is stated to be useful when the adsorption system is operated at turndown conditions. The production/no feed step may be added to any known PSA cycle and/or substituted for the production step in any known PSA cycle. The cycle changes may be evaluated using methods, software, and techniques like those described by Mehrotra et al.

Co-Current Depressurizing Equalization Step ($DEQ_p\#$)

The co-current depressurizing equalization step has also been termed the "equalization down step" and the "pressure decreasing equalization step." The depressurizing equalization step is abbreviated herein as "$DEQ_p$" or "$DEQ_p\#$", where # is an integer number depending on how many pressurizing equalization steps are present in the PSA cycle.

A co-current depressurizing (pressure decreasing) equalization step comprises co-currently withdrawing a pressure equalization gas from an adsorption bed undergoing the co-current depressurizing equalization step, and passing the pressure equalization gas to an adsorption bed undergoing a complementary pressurizing (pressure increasing) equalization step (e.g. PEQ, $PEQ_f$ or $PEQ_d$) or a hybrid step thereof thereby equalizing the pressure between the adsorption bed undergoing the co-current depressurizing equalization step and the adsorption bed undergoing the pressurizing equalization step at the end of the respective steps. The various forms of pressurizing equalization steps (PEQ, $PEQ_f$ or $PEQ_d$) including hybrid forms thereof are discussed below.

The phrase "equalizing the pressure" generally means that the pressure difference between the adsorption beds at the end of the co-current pressure equalization step is less than 250 kPa (36 psi). Then, at the end of the co-current depressurizing equalization step (DEQ) and the complementary pressurizing (pressure increasing) equalization step, the pressure in the adsorption bed at the end of the co-current depressurizing equalization step is no greater than 250 KPa more than the pressure in the adsorption bed at the end of the pressurizing equalization step.

The duration of the co-current depressurizing equalization step may be any suitable duration, for example from 1 second to 150 seconds, or from 10 seconds to 150 seconds, while shorter or longer times are possible. The skilled person can readily determine a suitable duration for a co-current depressurizing equalization step.

Multiple $DEQ_p$ steps may be used in the same PSA cycle. A $DEQ_p$ step may be used in the same PSA cycle with one or more $DEQ_f$ steps, one or more $DEQ_d$ steps, and/or one or more hybrid forms of the various depressurizing equalization steps (each described below).

As used herein, the term "depressurizing equalization step" is the generic term for the various depressurizing equalization steps, i.e. $DEQ_p$, $DEQ_f$, $DEQ_d$, and hybrid forms thereof.

Multiple depressurizing equalization steps, in one form or another (i.e. $DEQ_p$, $DEQ_f$, and $DEQ_d$), may be facilitated by increasing the number of adsorption beds.

The first co-current depressurizing equalization step is designated herein as $DEQ_p1$. The second co-current depressurizing equalization step is designated herein as $DEQ_p2$. The third co-current depressurizing equalization step is designated herein as $DEQ_p3$. Additional co-current depressurizing equalization steps are similarly designated.

Co-current depressurizing equalization steps are ubiquitous in pressure swing adsorption processes. Co-current depressurizing equalization steps are shown, for example, as "EQ1DN" and "EQ2DN" in Table 2 of U.S. Pat. No. 7,537,742, incorporated herein by reference. U.S. Pat. No. 7,537,742 illustrates a PSA cycle using two co-current depressurizing equalization steps for a cycle using 4 adsorption beds.

Table 2 of US 2012/0174776, incorporated herein by reference, discloses a 6 adsorption bed PSA cycle having 3 co-current depressurizing equalization steps shown therein as "E1", "E2", and "E3". US 2012/0174776 also discloses a hybrid depressurizing equalization step shown as "E4/BD1". Hybrid depressurizing equalization steps are described in more detail later below.

Additional co-current depressurization equalization steps have the effect of improving recovery of the desired product gas, i.e. hydrogen recovery can be increased by increasing the number of co-current pressure equalization steps. Additional depressurization equalization steps may also help to concentrate the more adsorbable component(s) in the by-product gas (tail gas) stream(s). However, the trade off may be to reduce the productivity of the system, i.e. the total amount of adsorbent required may become larger. More co-current depressurization equalization steps cause the impurities within the bed to advance closer to the product end of the adsorbent bed. This means that the volume of each bed must increase to maintain the desired production at the desired product purity. Each additional co-current depressurizing equalization step usually requires that another adsorption bed be added to the PSA system.

A co-current depressurization equalization step may be used in addition in any known PSA cycle and/or substituted for any depressurization equalization step in any known PSA cycle. The cycle changes may be evaluated using methods, software, and techniques like those described by Mehrotra et al.

Counter-Current Depressurizing Equalization Step ($DEQ_f\#$)

A counter-current depressurizing (pressure decreasing) equalization step is a depressurizing equalization with equalization gas withdrawn from the feed end and is abbreviated herein by "$DEQ_f$" or "$DEQ_f\#$", where # is an integer number depending on its arrangement in the PSA cycle and how many depressurizing equalization steps are present in the PSA cycle.

The counter-current depressurizing equalization step comprises counter-currently (i.e. from the feed end) withdrawing a pressure equalization gas from an adsorption bed undergoing the counter-current depressurizing equalization step, and passing the pressure equalization gas to an adsorption bed undergoing a complementary pressurizing (pressure increasing) equalization step (e.g. PEQ, $PEQ_f$ or $PEQ_d$) or a hybrid pressurizing equalization step thereby equalizing the pressure between the adsorption bed undergoing the counter-current depressurizing equalization step and the adsorption bed undergoing the pressurizing equalization step at the end of the step.

The duration of any $DEQ_f$ steps may be any suitable duration, for example from 1 second to 150 seconds, or from 10 seconds to 150 seconds, while shorter or longer times are possible. The skilled person can readily determine a suitable duration for $DEQ_f$ steps.

Multiple $DEQ_f$ steps may be used in the same PSA cycle. A $DEQ_f$ step may be used in the same PSA cycle with one or more $DEQ_p$ steps, one or more $DEQ_d$ steps, and/or one or more hybrid forms of the various DEQ steps (described below). Multiple depressurizing equalization steps, in one form or another (i.e. $DEQ_p$, $DEQ_f$, $DEQ_d$ and hybrid forms thereof), may be facilitated by increasing the number of adsorption beds. $DEQ_f$ steps may be numbered similarly to the $DEQ_p$ steps.

A $DEQ_f$ step is generally less effective at saving product gas ($H_2$) than a $DEQ_p$ step. $DEQ_p$ steps tend to sharpen the mass transfer zone of impurities within the adsorbent bed because the impurities desorbed from the feed end of the mass transfer zone are brought into contact with available adsorption sites in the mass transfer zone. $DEQ_f$ steps tend to spread the mass transfer zone because the impurities at the product end of the mass transfer zone tend to remain in place.

A counter-current depressurizing equalization step "$DEQ_f1$" is shown in FIGS. 5a and 5b.

Yoshida et al., *Ind. Eng. Chem. Res.*, Vol. 45, No. 18, pp. 6243-6250 (2006), incorporated herein by reference, also discloses a counter-current depressurizing equalization step.

A counter-current depressurization equalization step may be added to any known PSA cycle and/or substituted for any depressurization equalization step in any known PSA cycle. The cycle changes may be evaluated using methods, software, and techniques like those described by Mehrotra et al.

Dual Depressurizing Equalization Step ($DEQ_d\#$)

A dual depressurizing (pressure decreasing) equalization step is a depressurizing equalization step with equalization gas withdrawn from both the feed end and the product end of the bed and is abbreviated herein by "$DEQ_d$", or "$DEQ_d\#$", where # is an integer number depending on its arrangement in the PSA cycle and how many depressurizing equalization steps are present in the PSA cycle.

The dual depressurizing equalization step comprises counter-currently and co-currently withdrawing a pressure equalization gas from an adsorption bed undergoing the dual depressurizing equalization step, and passing the pressure equalization gas to an adsorption bed undergoing a complementary pressurizing (pressure increasing) equalization step ($PEQ_p$, $PEQ_f$, or $PEQ_d$, described below) or hybrid version of a pressurizing equalization step thereby equalizing the pressure between the adsorption bed undergoing the dual depressurizing equalization step and the adsorption bed undergoing the complementary pressurizing equalization step.

The duration of any $DEQ_d$ steps may be any suitable duration, for example from 1 second to 150 seconds, or from 10 seconds to 150 seconds, while shorter or longer times are possible. The skilled person can readily determine a suitable duration for $DEQ_d$ steps.

Multiple $DEQ_d$ steps may be used in the same PSA cycle. A $DEQ_d$ step may be used in the same PSA cycle with one or more $DEQ_p$ steps, one or more $DEQ_f$ and/or one or more hybrid forms of the various DEQ steps. Multiple depressurizing equalization steps, in one form or another (i.e. $DEQ_p$, $DEQ_f$, and $DEQ_d$), may be facilitated by increasing the number of adsorption beds. $DEQ_d$ steps may be numbered similarly to the $DEQ_p$ steps.

As disclosed in U.S. Pat. No. 4,783,203, incorporated herein by reference, a dual end depressurization creates a point of zero flow in the adsorbent-containing vessel. If this point of zero flow is advantageously located at the bulk mass transfer front of the controlling impurity, transfer of the less adsorbable gas to the bed receiving the effluent occurs with little or no advancement of the impurity front. Recovery of the less adsorbable gas can increase without requiring an increase in the amount of adsorbent that is required with the $DEQ_p$ step. This benefit comes at the cost of additional valves, gas handling, manifolds, and overall system complexity.

A dual depressurizing equalization step "$DEQ_d1$" is shown in FIGS. 5a and 5b.

A dual depressurizing equalization step is described in U.S. Pat. No. 4,783,203 as "double-ended depressurization and is also described, for example, in U.S. Pat. No. 8,545,601, incorporated herein by reference, as "two-end equalization depressurization, 2ED" (col. 6, line 43).

A dual depressurization equalization step may be added to any known PSA cycle and/or substituted for any depressurization equalization step in any known PSA cycle. The cycle changes may be evaluated using methods, software, and techniques like those described by Mehrotra et al.

Parallel Depressurizing Equalization Step (PDEQ#)

A parallel depressurizing (pressure decreasing) equalization is abbreviated herein as "PDEQ" or "PDEQ#", where # is an integer number depending on how many depressurizing equalization steps are present in the PSA cycle.

A parallel depressurizing equalization step comprises transferring gas from the adsorption bed undergoing the parallel depressurizing equalization step from one or more axial positions along the adsorption bed into an adsorption bed undergoing a pressurizing equalization step thereby equalizing the pressure between the adsorption bed undergoing the parallel depressurizing equalization step and the adsorption bed undergoing the pressurizing equalization step at the end of the respective steps. Normally, an adsorption bed undergoing the parallel depressurizing equalization step will be paired with an adsorption bed undergoing a complementary parallel pressurizing equalization step, described below, but could be paired with any pressurizing equalization step.

The duration of the parallel depressurizing equalization step may be any suitable duration, for example from 1 second to 150 seconds, or from 10 seconds to 150 seconds, while shorter or longer times are possible. The skilled person can readily determine a suitable duration for a parallel depressurizing equalization step.

Multiple PDEQ steps may be used in the same PSA cycle. A PDEQ step may be used in the same PSA cycle with one or more $DEQ_p$ steps, with one or more $DEQ_f$ steps, one or more $DEQ_d$ steps, and/or one or more hybrid forms of the various DEQ steps (each described below). Multiple depressurizing equalization steps, in one form or another (i.e. $DEQ_p$, $DEQ_f$, $DEQ_d$, and PDEQ), may be facilitated by increasing the number of adsorption beds. PDEQ steps may be numbered similarly to the $DEQ_p$ steps. Generally, the PDEQ# step is numbered according to its complementary PPEQ# step, e.g. PDEQ1 with PPEQ1, PDEQ2 with PPEQ2, etc.

The parallel depressurizing equalization step and parallel pressurizing equalization step are described, for example, in Yoshida et al., *Ind. Eng. Chem. Res.*, Vol. 45, No. 18, pp. 6243-6250 (2006).

A parallel depressurizing equalization step and a parallel pressurizing equalization step may be added to any known PSA cycle and/or substituted for any corresponding depressurizing and pressurizing equalization steps in any known PSA cycle. The cycle changes may be evaluated using methods, software, and techniques like those described by Mehrotra et al.

Counter-Current Pressurizing Equalization Step ($PEQ_p$#)

The counter-current pressurizing equalization step has also been termed the "equalization up step" and the "pressure increasing equalization step." The counter-current pressurizing equalization step is abbreviated herein as "$PEQ_p$" or "$PEQ_p$#", where # is an integer number depending on how many pressurizing equalization steps are present in the PSA cycle.

A counter-current pressurizing (pressure increasing) equalization step comprises counter-currently introducing the pressure equalization gas from the adsorption bed undergoing a complementary depressurizing (pressure decreasing) equalization step (e.g. DEQ, $DEQ_f$ or $DEQ_d$) or hybrid version of a depressurizing equalization step into the adsorption bed undergoing the counter-current pressurizing (pressure increasing) equalization step thereby equalizing the pressure between the adsorption bed undergoing the depressurizing equalization step and the adsorption bed undergoing the counter-current pressurizing equalization step at the end of the respective steps.

The duration of the counter-current pressurizing equalization step may be any suitable duration, for example from 1 second to 150 seconds, or from 10 seconds to 150 seconds, while shorter or longer times are possible. The skilled person can readily determine a suitable duration for a counter-current pressurizing equalization step.

Multiple $PEQ_p$ steps may be used in the same PSA cycle. A $PEQ_p$ step may be used in the same PSA cycle with one or more $PEQ_f$ steps, one or more $PEQ_d$ steps, and/or one or more hybrid forms of the various PEQ steps (each described below).

As used herein, the term "pressurizing equalization step" is the generic term for the various pressurizing equalization steps, i.e. $PEQ_p$, $PEQ_f$, $PEQ_d$, and hybrid forms thereof.

Multiple pressurizing equalization steps, in one form or another (i.e. $PEQ_p$, $PEQ_f$, and $PEQ_d$, including hybrid forms thereof), may be facilitated by increasing the number of adsorption beds. PEQ steps may be numbered similarly to the $DEQ_p$ steps. Generally, the $PEQ_p$# step is numbered according to its complementary DEQ# step, e.g. $PEQ_p$1 with DEQ1, $PEQ_p$2 with DEQ2, etc.

Counter-current pressurizing equalization steps are ubiquitous in pressure swing adsorption processes. Counter-current pressurizing equalization steps are shown, for example, as "EQ1UP" and "EQ2UP" in Table 2 of U.S. Pat. No. 7,537,742, which illustrates a PSA cycle using two counter-current pressurizing equalization steps for a cycle using 4 adsorption beds.

Table 2 of US 2012/0174776, discloses a 6 adsorption bed PSA cycle having 4 counter-current pressurizing equalization steps shown as "E1'", "E2'", "E3'", and "E4'". The E4' step is complementary to a hybrid depressurizing equalization step, discussed later below.

A counter-current pressurizing equalization step may be added to any known PSA cycle and/or substituted for any pressurization equalization step in any known PSA cycle. The cycle changes may be evaluated using methods, software, and techniques like those described by Mehrotra et al.

Co-Current Pressurizing Equalization ($PEQ_f$#)

The co-current pressurizing (pressure increasing) equalization step is abbreviated herein as "$PEQ_f$" or "$PEQ_f$#", where # is an integer number depending on how many pressurizing equalization steps are present in the PSA cycle.

The co-current pressurizing equalization step comprises co-currently introducing the pressure equalization gas from an adsorption bed undergoing a complementary depressurizing (pressure decreasing) equalization step (e.g. DEQ, $DEQ_f$, or $DEQ_d$ or hybrid form thereof) into the feed end of the adsorption bed undergoing the co-current pressurizing equalization thereby equalizing the pressure between the adsorption bed undergoing the depressurizing equalization step and the adsorption bed undergoing the co-current pressurizing equalization step at the end of the respective steps.

The duration of any $PEQ_f$ steps may be any suitable duration, for example from 1 second to 150 seconds, or from 10 seconds to 150 seconds, while shorter or longer times are possible. The skilled person can readily determine a suitable duration for $PEQ_f$ steps.

Multiple $PEQ_f$ steps may be used in the same PSA cycle. A $PEQ_f$ step may be used in the same PSA cycle with one or more $PEQ_p$ steps, one or more $PEQ_d$ steps (described below) and/or one or more hybrid forms of the various PEQ steps (described below). Multiple pressurizing equalization steps, in one form or another (i.e. $PEQ_p$, $PEQ_f$, and $PEQ_d$), may be facilitated by increasing the number of adsorption beds. $PEQ_f$ steps may be numbered similarly to the PEQ steps.

A co-current pressurizing equalization step is shown in FIGS. 4a and 4b as "$PEQ_f$1."

A PSA cycle employing co-current pressurizing equalization steps is described, for example in US 2005/0098034, incorporated herein by reference.

A co-current pressurizing equalization step may be added to any known PSA cycle and/or substituted for any pressurization equalization step in any known PSA cycle. The cycle changes may be evaluated using methods, software, and techniques like those described by Mehrotra et al.

Dual Pressurizing Equalization Step ($PEQ_d$#)

A dual pressurizing (pressure increasing) equalization step is a pressurizing equalization step with equalization gas introduced into both the feed end and the product end of the bed and is abbreviated herein by "$PEQ_d$", or "$PEQ_d$#", where # is an integer number depending on its arrangement in the PSA cycle and how many pressurizing equalization steps are present in the PSA cycle.

The dual pressurizing equalization step comprises co-currently and counter-currently introducing a pressure equalization gas from an adsorption bed undergoing a complementary depressurizing (pressure decreasing) equalization step (e.g. DEQ, $DEQ_f$, or $DEQ_d$ or hybrid version thereof) into the feed end and the product end of the adsorption bed undergoing the dual pressurizing equalization step thereby equalizing the pressure between the adsorption bed undergoing the complementary depressurizing equalization step and the adsorption bed undergoing the dual pressurizing equalization step at the end of the respective steps.

The duration of any $PEQ_d$ steps may be any suitable duration, for example from 1 second to 150 seconds, or from 10 seconds to 150 seconds, while shorter or longer times are possible. The skilled person can readily determine a suitable duration for $PEQ_d$ steps.

Multiple $PEQ_d$ steps may be used in the same PSA cycle. A $PEQ_d$ step may be used in the same PSA cycle with one or more $PEQ_p$ steps, one or more $PEQ_f$ steps (described above) and/or one or more hybrid forms of the various PEQ steps. Multiple pressurizing equalization steps, in one form or another (i.e. $PEQ_p$, $PEQ_f$, and $PEQ_d$), may be facilitated by increasing the number of adsorption beds. $PEQ_d$ steps may be numbered similarly to the $PEQ_p$ steps.

A dual pressurizing equalization step is shown in FIGS. 5a and 5b as "$PEQ_d1$."

A dual pressurizing equalization step is also described, for example, in U.S. Pat. No. 8,545,601, as "two-end equalization repressurization, 2ER"' (col. 8 line 22).

A dual pressurizing equalization step may be added to any known PSA cycle and/or substituted for any pressurization equalization step in any known PSA cycle. The cycle changes may be evaluated using methods, software, and techniques like those described by Mehrotra et al.

Parallel Pressurizing Equalization Step (PPEQ#)

A parallel pressurizing (pressure increasing) equalization is abbreviated herein as "PPEQ" or "PPEQ#", where # is an integer number depending on how many pressurizing equalization steps are present in the PSA cycle.

A parallel pressurizing equalization step comprises transferring gas from an adsorption bed undergoing a depressurizing equalization step into one or more axial positions along the adsorption bed undergoing the parallel pressurizing equalization step thereby equalizing the pressure between the adsorption bed undergoing the depressurizing equalization step and the adsorption bed undergoing the parallel pressurizing equalization step at the end of the respective steps. Normally, an adsorption bed undergoing the parallel pressurizing equalization step will be paired with an adsorption bed undergoing a complementary parallel depressurizing equalization step, but could be paired with any depressurizing equalization step.

The duration of the parallel pressurizing equalization step may be any suitable duration, for example from 1 second to 150 seconds, or from 10 seconds to 150 seconds, while shorter or longer times are possible. The skilled person can readily determine a suitable duration for a parallel pressurizing equalization step.

Multiple PPEQ steps may be used in the same PSA cycle. A PPEQ step may be used in the same PSA cycle with one or more $PEQ_p$ steps, with one or more $PEQ_f$ steps, one or more $PEQ_d$ steps, and/or one or more hybrid forms of the various PEQ steps (each described below). Multiple pressurizing equalization steps, in one form or another (i.e. $PEQ_p$, $PEQ_f$, $PEQ_d$, and PPEQ), may be facilitated by increasing the number of adsorption beds. PPEQ steps may be numbered similarly to the DEQ steps. Generally, the PPEQ# step is numbered according to its complementary PDEQ# step, e.g. PDEQ1 with PPEQ1, PDEQ2 with PPEQ2, etc.

A parallel pressurizing equalization step may be added to any known PSA cycle and/or substituted for any pressurization equalization step in any known PSA cycle. The cycle changes may be evaluated using methods, software, and techniques like those described by Mehrotra et al.

Partial Equalization Steps (pPEQ, pDEQ)

Any of the equalization steps (pressurizing and depressurizing) or hybrid forms thereof may be partial equalization steps. In a partial equalization step, the pressure difference between the adsorption beds that are exchanging gas is greater than 250 kPa (36 psi) at the end of the partial equalization step. The transfer of equalization gas between the adsorption beds is stopped before the pressure is equalized. In $H_2$ PSA processes halting the transfer of gas between beds prior to complete pressure equalization for PEQ steps will keep the impurities farther from the product end of the column, allowing the system to process more feed gas at the expense of hydrogen recovery.

Partial equalization is disclosed, for example, in U.S. Pat. No. 6,565,628, incorporated herein by reference.

Partial equalization steps may be added to any known PSA cycle and/or substituted for any equalization steps in any known PSA cycle. The cycle changes may be evaluated using methods, software, and techniques like those described by Mehrotra et al.

Compressor-Enhanced Equalization Steps

Any of the equalization step (pressurizing and depressurizing) or hybrid forms thereof may be compressor-enhanced equalization steps. In compressor-enhanced equalization steps, a compressor is used to assist the movement of gas between adsorption beds, from intermediate storage tanks to adsorption beds, and/or from adsorption beds to intermediate storage tanks. For example, after two adsorption beds have pressure equalized, a compressor could be used to continue the transfer of gas so that that pressure of the adsorption bed receiving the gas can exceed the pressure of the bed supplying the gas.

Compressor-enhanced equalization steps may be added to any known PSA cycle and/or substituted for any equalization steps in any known PSA cycle. The cycle changes may be evaluated using methods, software, and techniques like those described by Mehrotra et al.

Supply Purge Gas Step (SPG)

The supply purge gas step, abbreviated "SPG" herein, has also been termed the "provide purge gas step."

The supply purge gas step comprises co-currently withdrawing a purge gas from an adsorption bed undergoing the supply purge gas step, and passing the purge gas from the adsorption bed undergoing the supply purge gas step to an adsorption bed undergoing a purge step (PRG), described below. During a standard supply purge gas step, no gas is introduced into the adsorption bed undergoing the supply purge gas step.

The purge gas may be stored temporarily in an intermediate storage tank before the purge gas is used to purge the vessel undergoing the purge step. Use of an intermediate storage tank allows for the cycle to be asynchronous and provides flexibility in the duration of the various steps. For example, in U.S. Pat. No. 4,461,630, incorporated herein by reference, a portion or all of the purge gas is stored in a storage vessel prior to use as purge gas.

The purge gas may be stored temporarily in an intermediate storage tank that is designed to spatially "hold" the exiting impurity profile, and then reverse the profile when used in a purge step. Inversion of the exiting impurity profile adds the purist purge gas at the end of the purge step, ensuring that the adsorbent at the product end of the adsorbent bed is less contaminated by impurities than if the supplied purge gas were sent directly to the adsorbent bed undergoing its purge step. For example, in U.S. Pat. No. 4,512,779, incorporated herein by reference, external tanks are designed and employed within the cycle to reverse the impurity front profile of co-current depressurization gases before use as purge or counter-current equalization repressurization.

An adsorption bed undergoing a supply purge gas step may supply purge gas to one or more adsorption beds. For example, in U.S. Pat. No. 6,379,431 (EP1486245), incorporated herein by reference, two beds receive purge gas from the bed that is supplying purge gas.

Supply purge gas steps are ubiquitous in the art. A supply purge gas step is shown in FIGS. 2a, and 2b of US2013/0239807 A1 as "pp."

Purge Step (PRG)

The purge step, abbreviated "PRG" herein, comprises counter-currently introducing the purge gas from the adsorption bed undergoing a complementary supply purge gas step (SPG) or hybrid version thereof (e.g. production/supply purge gas step (P/SPG) described later), into an adsorption bed undergoing the purge step and counter-currently withdrawing a purge gas effluent from the adsorption bed undergoing the purge step. The purge gas effluent has a concentration of the secondary gas components that is higher than the concentration of the secondary gas components in the feed gas mixture. Performing the purge step at as low a pressure as economically possible increases the effectiveness of the step and the overall efficiency of the process.

A portion of the purge gas effluent may be compressed and used as a rinse gas. The purge gas effluent may be removed from the PSA process as a waste or tail gas stream. The tail gas from a PSA as part of a hydrogen production plant with a steam methane reformer is frequently used as a fuel in the steam methane reformer.

Purge steps are ubiquitous in the art. A purge step is shown, for example in FIGS. 2a, and 2b of US2013/0239807 A1 as "purge."

Counter-Current Blowdown Step ($BD_f$)

The counter-current blowdown step, abbreviated "$BD_f$," herein, comprises counter-currently withdrawing a blowdown gas from an adsorption bed undergoing the blowdown step. The blowdown gas has a concentration of the secondary gas components that is higher than the concentration of the secondary gas components in the feed gas mixture. The blowdown gas may be withdrawn from the adsorption bed undergoing the counter-current blowdown step until the pressure in the adsorption bed undergoing the counter-current blowdown step reaches a blowdown pressure ranging from 100 kPa to 500 kPa. The blowdown pressure is the pressure in the adsorption bed at the end of the counter-current blowdown step.

The counter-current blowdown step is ubiquitous in the art. A counter-current blowdown step is shown in FIGS. 2a and 2b of US2013/0239807 as "bd."

Co-Current Blowdown Step ($BD_p$)

The co-current blowdown step, abbreviated "$BD_p$," herein, comprises co-current withdrawal of a blowdown gas from the product end of an adsorption bed undergoing the co-current blowdown step. The blowdown gas has a concentration of the secondary gas components that is higher than the concentration of the secondary gas components in the feed gas mixture. The blowdown gas may be withdrawn from the adsorption bed undergoing the co-current blowdown step until the pressure in the adsorption bed undergoing the co-current blowdown step reaches a blowdown pressure ranging from 100 kPa to 500 kPa. The blowdown pressure is the pressure in the adsorption bed at the end of the co-current blowdown step.

A co-current blowdown step is shown in FIG. 4a and FIG. 4b as "$BD_p$."

A co-current blowdown step is also described, for example, in U.S. Pat. No. 7,550,030, incorporated herein by reference, as the "fuel" step (cf. FIGS. 2, 5, and 6).

Dual Blowdown Step ($BD_d$)

The dual blowdown step, abbreviated "$BD_d$," herein, comprises simultaneous counter-current and co-current withdrawal of a blowdown gas from an adsorption bed undergoing the dual blowdown step. The overall blowdown gas (i.e. the combined blowdown gas from the feed end and the product end of the adsorption bed) has a concentration of the secondary gas components that is higher than the concentration of the secondary gas components in the feed gas mixture. The effluent gas withdrawn from the product end of the adsorption bed may not have a concentration of secondary gas components that is higher than the concentration of the secondary gas components in the feed gas mixture. The blowdown gas may be withdrawn from the adsorption bed undergoing the dual blowdown step until the pressure in the adsorption bed undergoing the dual blowdown step reaches a blowdown pressure ranging from 100 kPa to 500 kPa. The blowdown pressure is the pressure in the adsorption bed at the end of the dual blowdown step.

A dual blowdown step is shown in FIG. 5a and FIG. 5b as "$BD_d$."

A dual blowdown step is also described, for example, in U.S. Pat. No. 4,783,203, incorporated herein by reference, as "double-end depressurization" which immediately precedes a counter-current purge step (col. 7, lines 26-41).

The advantage of a dual blowdown step is that the pressure drop during evacuation is reduced.

As used herein, the term "blowdown step" is the generic term for the various blowdown steps, i.e. $B_{Dp}$, $B_{Df}$, $B_{Dd}$, and hybrid forms thereof. A portion of the blowdown gas may be compressed and used as a rinse gas in the rinse step.

A counter-current blowdown step may be added to any known PSA cycle and/or substituted for any blowdown step in any known PSA cycle. A co-current blowdown step may be added to any known PSA cycle and/or substituted for any blowdown step in any known PSA cycle. A dual blowdown step may be added to any known PSA cycle and/or substituted for any blowdown step in any known PSA cycle. The cycle changes may be evaluated using methods, software, and techniques like those described by Mehrotra et al.

Evacuation Steps (EV)

In addition to or in place of the various blowdown steps, the PSA cycle may include one or more evacuation steps. Evacuation steps are similar to the various blowdown steps or hybrid forms thereof, with the addition of using a compressor, vacuum pump, or the like, to draw the pressure down below atmospheric pressure. The pressure of the purge step may be lowered using a compressor, vacuum pump or the like. When multiple adsorption beds undergo evacuation steps at the same time but starting at different time and multistage vacuum equipment is used, it will be economically favorable to direct the effluent from the adsorption bed at the lowest to the first stage of the compressor and combine the effluent of the first stage of the compressor with the effluent of an adsorption bed at a higher pressure.

Evacuation from both ends of the adsorption bed (i.e. dual evacuation), has the advantage of reduced pressure drop during evacuation. In case of using a vacuum pump to assist with evacuation, a dual evacuation step reduces the size and cost of the vacuum pump and pumping power required compared to co-current and counter-current evacuation.

An evacuation step may be added to any known PSA cycle and/or substituted for any of the blowdown steps. The cycle changes may be evaluated using methods, software, and techniques like those described by Mehrotra et al.

Rinse Step (R)

The rinse step is abbreviated "R". The rinse step comprises co-currently introducing a rinse gas into an adsorption bed undergoing the rinse step while simultaneously co-currently withdrawing a rinse gas effluent from the adsorption bed undergoing the rinse step. The rinse gas effluent, or portion thereof, may be combined with the product gas. The rinse gas effluent, or portion thereof, may be used to pressurize another adsorption bed. The rinse gas may be formed by compressing at least a portion of at least one of the blowdown gas from the adsorption bed undergoing a blowdown step and/or at least a portion of the purge gas effluent from the adsorption bed undergoing a purge step. A compressor compresses the blowdown gas and/or purge gas effluent to form the rinse gas. During a rinse step, the more strongly adsorbed components displace the less strongly adsorbed components from the adsorbent and void spaces, providing a means to increase the recovery of the less strongly adsorbed components.

The rinse gas may be formed from a portion of the blowdown gas and none of the purge gas effluent, all of the blowdown gas and none of the purge gas effluent, a portion of the blowdown gas and a portion of the purge gas effluent, all of the blowdown gas and a portion of the purge gas effluent, none of the blowdown gas and a portion of the purge gas effluent, or none of the blowdown gas and all of the purge gas effluent. The rinse gas may be passed directly to the adsorption bed undergoing the rinse step or stored temporarily in an intermediate storage tank before being passed to the adsorption bed undergoing the rinse step.

When the repetitive cycle includes a rinse step, any of the repressurization steps may further comprise counter-currently introducing at least a portion of the rinse gas effluent from the adsorption bed undergoing the rinse step into the adsorption bed undergoing the repressurization step. In addition or alternatively, at least a portion of the rinse gas effluent may be co-currently or counter-currently introduced into an adsorption bed undergoing a pressurizing equalization step or counter-currently introduced into an adsorption bed undergoing a purge step.

The rinse gas may also come from a source of gas that does not come from the PSA process itself. A secondary gas supply stream, preferably leaner in $H_2$ than the feed gas mixture, can be used advantageously as the rinse gas.

A rinse step is shown in FIGS. 4a and 4b of US2013/0239807 as "rinse."

Idle Step (I)

As the name suggests, in the idle step, abbreviated "I", the adsorption bed is idle and no gases flow into or out of the adsorption bed.

An idle step is shown in FIGS. 11a and 11b of US2013/0239807 as "idle."

An idle step may be added to any known PSA cycle.

Counter-Current Product Pressurization Step ($PP_p$)

The counter-current product pressurization step, abbreviated "$PP_p$", comprises counter-currently introducing product gas into the bed to pressurize the vessel. Product gas may be introduced into the adsorption bed undergoing the counter-current product pressurization step until the adsorption bed undergoing the counter-current product pressurization step is substantially at the feed gas pressure. "Substantially at the feed gas pressure" means within 10% of the feed gas pressure.

A counter-current product pressurization step is shown in FIGS. 2a and 2b of US2013/0239807 as "repr." Product gas 103 is introduced (excluding the optional introduction of feed gas 81) into the adsorption bed undergoing the "repr" step.

Co-Current Product Pressurization Step ($PP_f$)

The co-current product pressurization step, abbreviated "$PP_f$," comprises co-currently introducing product gas into the feed end of the bed to pressurize the vessel. Product gas may be introduced into the adsorption bed undergoing the co-current product pressurization step until the adsorption bed undergoing the co-current product pressurization step is substantially at the feed gas pressure.

A co-current product pressurization step is shown in FIG. 5a and FIG. 5b as "$PP_f$."

Dual Product Pressurization Step ($PP_d$)

The dual product pressurization step, abbreviated "$PP_d$" comprises co-currently and counter-currently introducing product gas into the adsorption bed to pressurize the vessel. Product gas may be introduced into the adsorption bed undergoing the dual product pressurization step until the adsorption bed undergoing the dual product pressurization step is substantially at the feed gas pressure.

A dual product pressurization step is shown in FIG. 4a and FIG. 4b as "$PP_d$."

As used herein, the term "product pressurization step" is the generic term for the various product pressurization steps, i.e. $PP_p$, $PP_f$, $PP_d$, and hybrid forms thereof.

Co-Current Feed Pressurization Step ($FP_f$)

The co-current feed pressurization step, abbreviated "$FP_f$" comprises co-currently introducing feed gas into the adsorption bed to pressurize the vessel. Feed gas may be introduced into the adsorption bed undergoing the co-current feed pressurization step until the adsorption bed undergoing the co-current feed pressurization step is substantially at the feed gas pressure.

Co-current feed gas pressurization is disclosed, for example, in paragraph [0050] of US 2003/0015091, incorporated herein by reference, where it discloses that the repressurization step proceeds by introducing pressurized feed gas into the feed end of the bed, introducing product gas into the product end of the bed, or by simultaneously introducing pressurized feed gas into the feed end of the bed and introducing product gas into the product end of the bed.

A feed pressurization step is also disclosed, for example, in U.S. Pat. No. 5,082,474, incorporated herein by reference.

Counter-Current Feed Pressurization Step ($FP_p$)

The counter-current feed pressurization step, abbreviated "$FP_p$," comprises counter-currently introducing feed gas into the adsorption bed to pressurize the vessel. Feed gas may be introduced into the adsorption bed undergoing the feed pressurization step until the adsorption bed undergoing the counter-current feed pressurization step is substantially at the feed gas pressure.

A counter-current feed pressurization step is disclosed, for example, in U.S. Pat. No. 5,232,473, incorporated herein by reference.

As used herein, the term "feed pressurization step" is the generic term for the various feed pressurization steps, i.e. $FP_p$, $FP_f$, and hybrid forms thereof.

Rinse Gas Effluent Pressurization Step (REP)

The rinse gas effluent pressurization step, abbreviated "REP" comprises counter-currently introducing rinse gas effluent (i.e. effluent from adsorption bed undergoing the rinse step) into the adsorption bed undergoing the rinse gas effluent pressurization step to pressurize the vessel. Rinse gas effluent may be introduced into the adsorption bed undergoing the rinse gas effluent pressurization step until the adsorption bed undergoing the rinse gas effluent pressurization step is substantially at the feed gas pressure.

A rinse gas effluent pressurization step is shown in FIGS. 4a, 4b, 11a and 11b of US2013/0239807 as "repr," but without the optional feed gas pressurization. The rinse gas effluent 92 from the adsorption bed on the rinse step is divided, where a portion of the rinse gas effluent is passed to the bed undergoing the rinse gas effluent pressurization step and another portion is combined with product gas 103 from an adsorption bed on the production step.

As used herein, the term "repressurization step" is the generic term that includes the various product pressurization steps, i.e. PP$_p$, PP$_f$, PP$_d$, and hybrid forms thereof, the various feed pressurization steps, i.e. FP$_p$, FP$_f$, and hybrid forms thereof, and the rinse gas effluent pressurization step and hybrid forms thereof.

Any of the various feed pressurization steps, product pressurization steps and rinse gas effluent pressurization step may be added to any known PSA cycle and/or substituted for any repressurization step in any known PSA cycle, if desired. The cycle changes may be evaluated using methods, software, and techniques like those described by Mehrotra et al.

Hybrid Steps

Many of the basic PSA cycle steps may be combined with others to form hybrid steps as described below. The concurrent combination of PSA cycles steps can allow the process to be completed with fewer adsorption beds often with a small or no impact on the efficiency of the process.

Depressurizing Equalization/Rinse Step (DEQ/R)

Depressurizing equalization may be combined with rinse in a hybrid depressurizing equalization/rinse step, abbreviated "DEQ/R" or "DEQ#/R", where # is an integer number depending on how many depressurizing equalization steps are present in the PSA cycle.

The depressurizing equalization/rinse step comprises co-currently introducing rinse gas simultaneous with co-currently withdrawing a pressure equalization gas from an adsorption bed undergoing the depressurizing equalization/rinse step, and passing the pressure equalization gas to an adsorption bed undergoing a complementary pressurizing (pressure increasing) equalization step (e.g. PEQ, PEQ$_f$ or PEQ$_d$) or a hybrid step thereof, thereby equalizing the pressure between the adsorption bed undergoing the depressurizing equalization/rinse step and the adsorption bed undergoing the complementary pressurizing equalization step (PEQ, PEQ$_f$ or PEQ$_d$ including hybrid forms thereof).

The characteristics and options disclosed for the depressurizing equalization step and the characteristics and options disclosed for the rinse step apply to the hybrid depressurizing equalization/rinse step.

A depressurizing equalization/rinse step is shown in FIGS. 2a and 2b of US2013/0239807 as "eq1d." Rinse gas 91 is introduced into the adsorption bed undergoing the "eq1d" step while equalization gas 83 is simultaneously withdrawn and equalized with the adsorption bed undergoing the pressurizing equalization step "eq1r."

A depressurizing equalization/rinse step is also shown in FIGS. 6a and 6b as DEQ$_p$1/R.

A depressurizing equalization/rinse step may be added to any known PSA cycle and/or substituted for any depressurizing equalization step in any known PSA cycle. The cycle changes may be evaluated using methods, software, and techniques like those described by Mehrotra et al.

Production/Rinse (P/R)

Production may be combined with rinse in a hybrid production/rinse step, abbreviated "P/R."

The production/rinse step comprises simultaneously introducing a feed gas mixture and rinse gas into the adsorption bed undergoing the production/rinse step while simultaneously withdrawing a product gas from the adsorption bed undergoing the production/rinse step.

The characteristics and options disclosed for the production step and the characteristics and options disclosed for the rinse step apply to the hybrid production/rinse step.

A production/rinse step "P/R" is shown in FIGS. 6a and 6b.

A production/rinse step may be added to any known PSA cycle and/or substituted for any production step in any known PSA cycle. The cycle changes may be evaluated using methods, software, and techniques like those described by Mehrotra et al.

A production/rinse step is shown in FIG. 5b of US2013/0239807 as "rinse." Rinse gas effluent 91 is combined with the effluent of an adsorbent bed undergoing the production step ("feed"), a portion of the effluent 91 exits the system as product (stream 103), and a portion is combined for counter-current repressurization of another adsorbent bed ("repr").

Production/Supply Product Step (P/SP)

Production may be combined with supplying product to another bed in a hybrid production/supply product step, abbreviated "P/SP."

In a production/supply product step, a portion of the product gas withdrawn from adsorption bed undergoing the production/supply product step is passed to an adsorption bed undergoing a product pressurization step or a hybrid product pressurization step.

The characteristics and options disclosed for the production step apply to the hybrid production/supply product step.

A production/supply product step is shown in FIGS. 2a and 2b of US2013/0239807 as "feed." A portion of the product gas withdrawn from the adsorption bed undergoing the "feed" step is passed to the adsorption bed undergoing the product pressurization step "repr" thereby pressurizing the adsorption bed with product gas.

Production while supplying product to another adsorption bed for product pressurization is also disclosed, for example, as A2/PP1 and A3/PP2 in Table 2 of US 2012/0174776, incorporated herein by reference.

A production/supply product step "P/SP" is shown in FIGS. 2a, 2b, 4a, 4b, 5a, and 5b.

A production/supply product step may be added to any known PSA cycle and/or substituted for any production step in any known PSA cycle. The cycle changes may be evaluated using methods, software, and techniques like those described by Mehrotra et al.

Production/Rinse/Supply Product Step (P/R/SP)

Production may be combined with rinse and supply product in a hybrid production/rinse/supply product step, abbreviated "P/R/SP."

The production/rinse/supply product step comprises simultaneously introducing a feed gas mixture and rinse gas into the adsorption bed undergoing the production/rinse step while simultaneously withdrawing a product gas from the adsorption bed undergoing the production/rinse step. A portion of the product gas withdrawn from adsorption bed undergoing the production/rinse/supply product step is passed to an adsorption bed undergoing a product pressurization step or a hybrid product pressurization step.

The characteristics and options disclosed for the production step and the characteristics and options disclosed for the rinse step apply to the hybrid production/rinse step.

A production/rinse/supply product step "P/R/SP" is shown in FIGS. 7a and 7b.

Simultaneous production/rinse with supply product is disclosed, for example, in FIG. 1 and col. 1, lines 1-6 of U.S. Pat. No. 5,254,154, incorporated herein by reference.

A production/rinse/supply product step may be added to any known PSA cycle and/or substituted for any production step in any known PSA cycle. The cycle changes may be evaluated using methods, software, and techniques like those described by Mehrotra et al.

Production/Supply Purge Gas Step (P/SPG)

Production may be combined with supplying purge gas to another bed in a hybrid production/supply purge gas step, abbreviated "P/SPG."

In a production/supply purge gas step, a portion of the product gas withdrawn from adsorption bed undergoing the production/supply purge gas step is passed to an adsorption bed undergoing a purge step or a hybrid purge step.

An advantage of a production/supply purge gas step is that a separate supply purge gas step can be avoided. For a given number of adsorption beds, this may provide the opportunity to increase the number of equalization steps. Compared to a supply purge gas step (SPG), a production/supply purge step uses a gas containing a higher concentration of the less strongly adsorbed component as the purge gas, which in turn can decrease the recovery of the less strongly adsorbed component.

The production/supply purge gas step may be part of a PSA cycle with production steps at multiple pressure levels. The production/supply purge gas step may be combined with any of the multiple pressure level production steps in a hybrid step. The supply purge gas step may be conveniently combined with a lower pressure production step in a hybrid low pressure production/supply purge gas step. The production/supply gas purge step may precede, occur concurrently with, or follow the supply purge gas step (SPG).

The characteristics and options disclosed for the production step and supply purge gas step apply to the hybrid production/supply purge gas step.

Production while supplying product to another adsorption bed undergoing a purge step is disclosed, for example, in FIG. 7 and paragraph [0060] of US2005/0268780, incorporated herein by reference.

A production/supply purge gas step may be added to any known PSA cycle and/or substituted for any production step in any known PSA cycle. The cycle changes may be evaluated using methods, software, and techniques like those described by Mehrotra et al.

Supply Purge Gas/Feed Step (SPG/F)

Supplying purge gas may be combined with introduction of feed gas in a hybrid supply purge gas/feed step, abbreviated as SPG/F.

A supply purge gas/feed step comprises co-current withdrawal of purge gas to supply purge gas to another vessel undergoing the purge step (PRG) with contemporaneous co-current introduction of feed gas into the bed. The feed gas may be introduced into the bed undergoing the supply purge gas/feed step at a lower pressure than the feed gas is introduced into the bed undergoing the production step.

The supply purge gas/feed step (SPG/F) is distinguished from the production/supply purge gas step (P/SPG) in that the production/supply purge gas step, only a portion of the product gas is passed to a bed undergoing the purge step whereas in the supply purge gas/feed step, all of the effluent from the adsorption bed is passed to a bed undergoing the purge step.

A supply purge gas/feed step may be added to any known PSA cycle and/or substituted for any supply purge gas step in any known PSA cycle. The cycle changes may be evaluated using methods, software, and techniques like those described by Mehrotra et al.

Supply Purge Gas/Rinse Step (SPG/R)

Supplying purge gas may be combined with rinse in a hybrid supply purge gas/rinse step, abbreviated as "SPG/R."

A supply purge gas/rinse step comprises co-current withdrawal of gas to supply purge gas to another vessel undergoing the purge step (PRG) with contemporaneous co-current introduction of rinse gas.

The characteristics and options disclosed for the supply purge gas and the rinse step apply to the hybrid supply purge gas/rinse step.

A supply purge gas/rinse step is shown in FIG. 2b of US 2013/0239807 as "pp" where the optional introduction of rinse gas is included.

A supply purge gas/rinse step may be added to any known PSA cycle and/or substituted for any supply purge gas step in any known PSA cycle. The cycle changes may be evaluated using methods, software, and techniques like those described by Mehrotra et al.

Counter-Current Pressurizing Equalization/Feed Pressurization Step ($PEQ_p$/FP)

Counter-current pressurizing equalization may be combined with feed pressurization in a hybrid counter-current pressurizing equalization/feed pressurization step, abbreviated "$PEQ_p$/FP" or "$PEQ_p$#/FP", where # is an integer number depending on how many pressurizing equalization steps are present in the PSA cycle.

A counter-current pressurizing equalization/feed pressurization step comprises simultaneous co-current introduction of feed gas and counter-current introduction of pressure equalization gas from an adsorption bed undergoing a complementary depressurizing (pressure decreasing) equalization step (e.g. DEQ, $DEQ_f$, or $DEQ_d$ or hybrid version thereof) thereby equalizing the pressure between the adsorption bed undergoing the depressurizing equalization step and the adsorption bed undergoing the counter-current pressurizing equalization/feed pressurization step at the end of the respective steps.

The characteristics and options disclosed for the counter-current pressurizing equalization step and the feed pressurization step apply to the hybrid counter-current pressurizing equalization/feed pressurization step.

A counter-current pressurizing equalization/feed pressurization step is shown in FIGS. 2a and 2b of US2013/0239807 as "eq1r" when the optional introduction of feed gas 81 is included and optional introduction of product gas 103 is excluded.

A counter-current pressurizing equalization/feed pressurization step may be added to any known PSA cycle and/or substituted for any pressurizing equalization step in any known PSA cycle. The cycle changes may be evaluated using methods, software, and techniques like those described by Mehrotra et al.

Co-Current Pressurizing Equalization/Feed Pressurization Step ($PEQ_f$/FP)

The co-current pressurizing equalization step may be combined with feed pressurization in a hybrid co-current pressurizing equalization/feed pressurization step, abbreviated herein as "$PEQ_f$/FP" or "$PEQ_f$#/FP", where # is an integer number depending on how many pressurizing equalization steps are present in the PSA cycle.

The co-current pressurizing equalization step comprises simultaneous co-current introduction of feed gas and co-current introduction of a pressure equalization gas from an adsorption bed undergoing a complementary depressurizing (pressure decreasing) equalization step (e.g. DEQ, $DEQ_f$, or $DEQ_d$ or hybrid version thereof) thereby equalizing the pressure between the adsorption bed undergoing the depressurizing equalization step and the adsorption bed undergoing the co-current pressurizing equalization/feed pressurization step at the end of the respective steps.

The characteristics and options disclosed for the co-current pressurizing equalization step and the feed pressurization step apply to the hybrid co-current pressurizing equalization/feed pressurization step.

A co-current pressurizing equalization/feed pressurization step is shown in FIG. 8a and FIG. 8b as "$PEQ_f$1/FP." Equalization gas 83 from the bed undergoing a depressurizing equalization and feed gas 81 are both co-currently introduced the adsorption bed undergoing the co-current pressurizing equalization/feed pressurization step.

A co-current pressurizing equalization/feed pressurization step may be added to any known PSA cycle and/or substituted for any pressurizing equalization step in any known PSA cycle. The cycle changes may be evaluated using methods, software, and techniques like those described by Mehrotra et al.

Dual Pressurizing Equalization/Feed Pressurization Step ($PEQ_d$/FP)

The dual pressurizing equalization step may be combined with feed pressurization in a hybrid dual pressurizing equalization/feed pressurization step, abbreviated herein as "$PEQ_d$/FP" or "$PEQ_d$#/FP", where # is an integer number depending on how many pressurizing equalization steps are present in the PSA cycle.

The dual pressurizing equalization/feed pressurization step comprises co-current introduction of feed gas and co-current and counter-current introduction of a pressure equalization gas from an adsorption bed undergoing a complementary depressurizing equalization step (e.g. DEQ, $DEQ_p$ or $DEQ_d$ or hybrid version thereof) thereby equalizing the pressure between the adsorption bed undergoing the complementary depressurizing equalization step and the adsorption bed undergoing the dual pressurizing equalization step at the end of the respective steps.

The characteristics and options disclosed for the dual equalization step and the feed pressurization step apply to the hybrid dual pressurizing equalization/feed pressurization step.

A dual pressurizing equalization/feed pressurization step is shown in FIGS. 9a and 9b as $PEQ_d$1/FP. Feed gas 81 is introduced co-currently and equalization gas 83 from the bed undergoing a dual depressurizing equalization is introduced both co-currently and counter-currently into the bed undergoing the dual pressurizing equalization/feed pressurization step.

A dual pressurizing equalization/feed pressurization step may be added to any known PSA cycle and/or substituted for any pressurizing equalization step in any known PSA cycle. The cycle changes may be evaluated using methods, software, and techniques like those described by Mehrotra et al.

Counter-Current Pressurizing Equalization/Product Pressurization Step ($PEQ_p$/PP)

Counter-current pressurizing equalization may be combined with product pressurization in a hybrid pressurizing equalization/product pressurization step, abbreviated "$PEQ_p$/PP" or "$PEQ_p$#/PP", where # is an integer number depending on how many pressurizing equalization steps are present in the PSA cycle.

A counter-current pressurizing equalization/product pressurization step comprises simultaneous counter-current introduction of product gas and counter-current introduction of pressure equalization gas from an adsorption bed undergoing a complementary depressurizing equalization step (e.g. DEQ, $DEQ_p$ or $DEQ_d$ or hybrid version thereof) thereby equalizing the pressure between the adsorption bed undergoing the depressurizing equalization step and the adsorption bed undergoing the counter-current pressurizing equalization/product pressurization step at the end of the respective steps.

The characteristics and options disclosed for the pressurizing equalization step and the product pressurization step apply to the hybrid pressurizing equalization/product pressurization step.

A counter-current pressurizing equalization/product pressurization step is shown in FIGS. 2a and 2b of US2013/0239807 as "eq1r" when the optional introduction of product gas 103 is included and optional introduction of feed gas 81 is excluded.

A counter-current pressurizing equalization/product pressurization step may be added to any known PSA cycle and/or substituted for any pressurizing equalization step in any known PSA cycle. The cycle changes may be evaluated using methods, software, and techniques like those described by Mehrotra et al.

Co-Current Pressurizing Equalization/Product Pressurization Step ($PEQ_f$/PP)

Co-current pressurizing equalization may be combined with product pressurization in a hybrid co-current pressurizing equalization/product pressurization step, abbreviated herein as "$PEQ_f$/PP" or "$PEQ_f$#/PP", where # is an integer number depending on how many pressurizing equalization steps are present in the PSA cycle.

A co-current pressurizing equalization/product pressurization step comprises simultaneous counter-current introduction of product gas and co-current introduction of pressure equalization gas from an adsorption bed undergoing a complementary depressurizing equalization step (e.g. DEQ, $DEQ_p$ or $DEQ_d$ or hybridized version thereof) thereby equalizing the pressure between the adsorption bed undergoing the depressurizing equalization step and the adsorption bed undergoing the co-current pressurizing equalization step at the end of the respective steps.

The characteristics and options disclosed for the co-current pressurizing equalization step and the product pressurization step apply to the hybrid co-current pressurizing equalization/product pressurization step.

A co-current pressurizing equalization/product pressurization step is shown in FIGS. 10a and 10b as $PEQ_f$1/PP, where product gas 103 is counter-currently introduced and pressure equalization gas 83 is co-currently introduced into the adsorption bed undergoing the co-current pressurizing equalization/product pressurization step.

A co-current pressurizing equalization/product pressurization step may be added to any known PSA cycle and/or substituted for any pressurizing equalization step in any known PSA cycle. The cycle changes may be evaluated using methods, software, and techniques like those described by Mehrotra et al.

Dual Pressurizing Equalization/Product Pressurization Step ($PEQ_d$/PP)

Dual pressurizing equalization may be combined with product pressurization in a hybrid dual pressurizing equalization/product pressurization step, abbreviated as "$PEQ_d$/PP" or "$PEQ_d$#/PP", where # is an integer number depending on how many pressurizing equalization steps are present in the PSA cycle.

A dual pressurizing equalization/product pressurization step comprises simultaneous counter-current introduction of product gas and co-current and counter-current introduction of a pressure equalization gas from an adsorption bed undergoing a complementary depressurizing equalization step (e.g. DEQ, $DEQ_p$ or $DEQ_d$ or hybrid version thereof) thereby equalizing the pressure between the adsorption bed undergoing the complementary depressurizing equalization step and the adsorption bed undergoing the dual pressurizing equalization/product pressurization step at the end of the respective steps.

The characteristics and options disclosed for the dual equalization step and the product pressurization step apply to the hybrid dual pressurizing equalization/feed pressurization step.

A dual pressurizing equalization/product pressurization step is shown in FIGS. 11a and 11b as $PEQ_d1/PP$. Product gas 103 is introduced counter-currently and equalization gas 83 from the bed undergoing a dual depressurizing equalization is introduced both co-currently and counter-currently into the bed undergoing a dual pressurizing equalization/product pressurization step.

A dual pressurizing equalization/product pressurization step may be added to any known PSA cycle and/or substituted for any pressurizing equalization step in any known PSA cycle. The cycle changes may be evaluated using methods, software, and techniques like those described by Mehrotra et al.

Counter-Current Pressurizing Equalization/Product Pressurization/Feed Pressurization Step ($PEQ_2$/PP/FP)

Counter-current pressurizing equalization may be combined with product pressurization and feed pressurization in a hybrid counter-current pressurizing equalization/product pressurization/feed pressurization step, abbreviated as $PEQ_p$/PP/FP or $PEQ_p\#$/PP/FP, where # is an integer number depending on how many pressurizing equalization steps are present in the PSA cycle.

A counter-current pressurizing equalization/product pressurization/feed pressurization step comprises simultaneous co-current introduction of feed gas, counter-current introduction of product gas, and counter-current introduction of pressure equalization gas from an adsorption bed undergoing a complementary depressurizing equalization step (e.g. DEQ, $DEQ_f$, or $DEQ_d$ or hybrid version thereof) thereby equalizing the pressure between the adsorption bed undergoing the depressurizing equalization step and the adsorption bed undergoing the counter-current pressurizing equalization/product pressurization/feed pressurization step at the end of the respective steps.

The characteristics and options disclosed for the counter-current pressurizing equalization step, the product pressurization step, and feed pressurization step apply to the hybrid counter-current pressurizing equalization/product pressurization step.

A counter-current pressurizing equalization/product pressurization/feed pressurization step is shown in FIGS. 2a and 2b of US2013/0239807 as "eq1r" when the optional introduction of product gas 103 and optional introduction of feed gas 81 are included. Paragraph [0116] of US2013/0239807 discloses that the first pressure increasing equalization step may further comprise co-currently introducing the feed gas mixture and/or counter-currently introducing product gas into the adsorption bed undergoing the first pressure increasing equalization step simultaneous with the counter-current introduction of the pressure equalization gas from the adsorption bed undergoing the first pressure decreasing equalization step.

A counter-current pressurizing equalization/product pressurization/feed pressurization step is also disclosed in US 2003/0015091 as "1'/R", for example in FIG. 1 and as described in paragraphs [0050] and [0056]. In paragraphs [0056] US 2003/0015091 discloses that 1'/R is the optional combined step of pressure equalization at increasing pressure and repressurization. In paragraph [0050], US 2003/0015091 discloses that the repressurization step proceeds by introducing pressurized feed gas into the feed end of the bed, introducing product gas into the product end of the bed, or by simultaneously introducing pressurized feed gas into the feed end of the bed and introducing product gas into the product end of the bed.

A counter-current pressurizing equalization/product pressurization/feed pressurization step may be added to any known PSA cycle and/or substituted for any pressurizing equalization step in any known PSA cycle. The cycle changes may be evaluated using methods, software, and techniques like those described by Mehrotra et al.

Co-Current Pressurizing Equalization/Product Pressurization/Feed Pressurization Step ($PEQ_f$/PP/FP)

Co-current pressurizing equalization may be combined with product pressurization and feed pressurization in a hybrid co-current pressurizing equalization/product pressurization/feed pressurization step, abbreviated as "$PEQ_f$/PP/FP" or "$PEQ_f\#$/PP/FP," where # is an integer number depending on how many pressurizing equalization steps are present in the PSA cycle.

A co-current pressurizing equalization/product pressurization/feed pressurization step comprises simultaneous co-current introduction of feed gas, counter-current introduction of product gas, and co-current introduction of pressure equalization gas from an adsorption bed undergoing a complementary depressurizing equalization step (e.g. DEQ, $DEQ_f$, or $DEQ_d$ or hybrid version thereof) thereby equalizing the pressure between the adsorption bed undergoing the depressurizing equalization step and the adsorption bed undergoing the co-current pressurizing equalization/product pressurization/feed pressurization step at the end of the respective steps.

The characteristics and options disclosed for the pressurizing equalization step, the product pressurization step, and feed pressurization step apply to the hybrid pressurizing equalization/product pressurization step.

A co-current pressurizing equalization/product pressurization/feed pressurization step is shown in FIGS. 12a and 12b as $PEQ_f1$/PP/FP. Product gas 103 is introduced counter-currently and both feed gas and equalization gas 83 from the bed undergoing a counter-current depressurizing equalization is introduced co-currently into the bed undergoing a co-current pressurizing equalization/product pressurization/feed pressurization step.

A co-current pressurizing equalization/product pressurization/feed pressurization step may be added to any known PSA cycle and/or substituted for any pressurizing equalization step in any known PSA cycle. The cycle changes may be evaluated using methods, software, and techniques like those described by Mehrotra et al.

Dual Pressurizing Equalization/Product Pressurization/Feed Pressurization Step ($PEQ_d$/PP/FP)

Dual pressurizing equalization may be combined with product pressurization and feed pressurization in a hybrid dual pressurizing equalization/product pressurization/feed pressurization step, abbreviated as "$PEQ_d$/PP/FP" or "$PEQ_d\#$/PP/FP", where # is an integer number depending on how many pressurizing equalization steps are present in the PSA cycle.

A dual pressurizing equalization/product pressurization/feed pressurization step comprises simultaneous counter-current introduction of product gas, co-current introduction of feed gas, and co-current and counter-current introduction of a pressure equalization gas from an adsorption bed undergoing a complementary depressurizing equalization step (e.g. DEQ, $DEQ_f$, or $DEQ_d$ or hybrid version thereof) thereby equalizing the pressure between the adsorption bed undergoing the complementary depressurizing equalization step and the adsorption bed undergoing the dual pressurizing equalization/product pressurization/feed pressurization step at the end of the respective steps.

The characteristics and options disclosed for the dual equalization step and the product pressurization step apply to the hybrid dual pressurizing equalization/feed pressurization step.

A dual pressurizing equalization/product pressurization/feed pressurization step is shown in FIGS. 13a and 13b as PEQ$_d$1/PP/FP. Product gas 103 is introduced counter-currently, feed gas is introduced co-currently, and equalization gas 83 from the bed undergoing a dual depressurizing equalization is introduced both co-currently and counter-currently into the bed undergoing a dual pressurizing equalization/product pressurization step.

A dual pressurizing equalization/product pressurization/feed pressurization step may be added to any known PSA cycle and/or substituted for any pressurizing equalization step in any known PSA cycle. The cycle changes may be evaluated using methods, software, and techniques like those described by Mehrotra et al.

Pressurizing Equalization/Rinse Gas Effluent Pressurization Step (PEQ/REP)

Pressurizing equalization may be combined with rinse gas effluent pressurization in a hybrid pressurizing equalization/rinse gas effluent pressurization step, abbreviated "PEQ/REP" or "PEQ#/REP", where # is an integer number depending on how many pressurizing equalization steps are present in the PSA cycle.

A pressurizing equalization/rinse gas effluent pressurization step comprises simultaneous counter-current introduction of rinse gas effluent from an adsorption bed undergoing a rinse step and counter-current introduction of pressure equalization gas from an adsorption bed undergoing a complementary depressurizing equalization step (e.g. DEQ, DEQ$_f$, or DEQ$_d$ or hybrid version thereof) thereby equalizing the pressure between the adsorption bed undergoing the depressurizing equalization step and the adsorption bed undergoing the pressurizing equalization/rinse gas effluent pressurization step at the end of the respective steps.

The characteristics and options disclosed for the pressurizing equalization step and the rinse gas effluent pressurization step apply to the hybrid pressurizing equalization/rinse gas effluent pressurization step.

The pressurizing equalization/rinse gas effluent pressurization step is a variant shown in FIGS. 15a and 15b of US2013/0239807 where the bed on "eq1r" is pressurized with pressure equalization gas from the bed on eq1d along with rinse gas effluent 92 (but without introduction of the optional feed gas 81). The rinse gas effluent 92 from the adsorption bed on the rinse step is divided, where a portion of the rinse gas effluent is passed to the bed undergoing the rinse gas effluent pressurization step and another portion is combined with product gas 103 from an adsorption bed on the production step.

A pressurizing equalization/rinse gas effluent pressurization step may be added to any known PSA cycle and/or substituted for any pressurizing equalization step in any known PSA cycle. The cycle changes may be evaluated using methods, software, and techniques like those described by Mehrotra et al.

Counter-Current Pressurizing Equalization/Rinse Gas Effluent Pressurization/Feed Pressurization Step (PEQ$_p$/REP/FP)

Counter-current pressurizing equalization may be combined with rinse gas effluent pressurization and feed pressurization in a hybrid counter-current pressurizing equalization/rinse gas effluent pressurization/feed pressurization step, abbreviated "PEQ$_p$/REP/FP" or "PEQ$_p$#/REP/FP", where # is an integer number depending on how many pressurizing equalization steps are present in the PSA cycle.

A counter-current pressurizing equalization/rinse gas effluent pressurization/feed pressurization step comprises simultaneous co-current introduction of feed gas, counter-current introduction of rinse gas effluent from an adsorption bed undergoing a rinse step, and counter-current introduction of pressure equalization gas from an adsorption bed undergoing a complementary depressurizing equalization step (e.g. DEQ, DEQ$_f$, or DEQ$_d$ or hybrid version thereof) thereby equalizing the pressure between the adsorption bed undergoing the depressurizing equalization step and the adsorption bed undergoing the pressurizing equalization/rinse gas effluent pressurization step at the end of the respective steps.

The characteristics and options disclosed for the counter-current pressurizing equalization step, the rinse gas effluent pressurization step, and feed pressurization step apply to the hybrid counter-current pressurizing equalization/rinse gas effluent pressurization/feed pressurization step.

The counter-current pressurizing equalization/rinse gas effluent pressurization/feed pressurization step is a variant shown in FIGS. 15a and 15b of US2013/0239807 where the bed on "eq1r" is pressurized with pressure equalization gas from the bed on eq1d along with rinse gas effluent 92, and with introduction of the optional feed gas 81. The rinse gas effluent 92 from the adsorption bed on the rinse step may be divided, where a portion of the rinse gas effluent is passed to the bed undergoing the rinse gas effluent pressurization step and another portion is combined with product gas 103 from an adsorption bed on the production step.

A counter-current pressurizing equalization/rinse gas effluent pressurization/feed pressurization step may be added to any known PSA cycle and/or substituted for any pressurizing equalization step in any known PSA cycle. The cycle changes may be evaluated using methods, software, and techniques like those described by Mehrotra et al.

Co-Current Pressurizing Equalization/Rinse Gas Effluent Pressurization/Feed Pressurization Step (PEQ$_c$/REP/FP)

Co-current pressurizing equalization may be combined with rinse gas effluent pressurization and feed pressurization in a hybrid co-current pressurizing equalization/rinse gas effluent pressurization/feed pressurization step, abbreviated as "PEQ$_c$/REP/FP" or "PEQ$_c$#/REP/FP," where # is an integer number depending on how many pressurizing equalization steps are present in the PSA cycle.

A co-current pressurizing equalization/rinse gas effluent pressurization/feed pressurization step comprises simultaneous co-current introduction of feed gas, counter-current introduction of rinse gas effluent from an adsorption bed undergoing a rinse step, and co-current introduction of pressure equalization gas from an adsorption bed undergoing a complementary depressurizing equalization step (e.g. DEQ, DEQ$_f$, or DEQ$_d$ or hybrid version thereof) thereby equalizing the pressure between the adsorption bed undergoing the depressurizing equalization step and the adsorption bed undergoing the co-current pressurizing equalization/product pressurization/feed pressurization step at the end of the respective steps.

The characteristics and options disclosed for the pressurizing equalization step, the rinse gas effluent pressurization step, and feed pressurization step apply to the hybrid co-current pressurizing equalization/rinse gas effluent pressurization/feed pressurization step.

A co-current pressurizing equalization/rinse gas effluent pressurization/feed pressurization step is shown in FIGS. 14a and 14b as PEW/REP/FP. Rinse gas effluent 92 is introduced counter-currently and both feed gas 81 and equalization gas 83 from the bed undergoing a hybrid counter-current depressurizing equalization DEQ1/R is introduced co-currently into the bed undergoing a co-current pressurizing equalization/rinse gas effluent pressurization/feed pressurization step.

A co-current pressurizing equalization/rinse gas effluent pressurization/feed pressurization step may be added to any known PSA cycle and/or substituted for any pressurizing equalization step in any known PSA cycle. The cycle changes may be evaluated using methods, software, and techniques like those described by Mehrotra et al.

Dual Pressurizing Equalization/Rinse Gas Effluent Pressurization/Feed Pressurization Step (PEQ$_d$/REP/FP)

Dual pressurizing equalization may be combined with rinse gas effluent pressurization and feed pressurization in a hybrid dual pressurizing equalization/rinse gas effluent pressurization/feed pressurization step, abbreviated as "PEQ$_d$/REP/FP" or "PEQ$_d$#/REP/FP", where # is an integer number depending on how many pressurizing equalization steps are present in the PSA cycle.

A dual pressurizing equalization/rinse gas effluent pressurization/feed pressurization step comprises simultaneous counter-current introduction of rinse gas effluent gas, co-current introduction of feed gas, and co-current and counter-current introduction of a pressure equalization gas from an adsorption bed undergoing a complementary depressurizing equalization step (e.g. DEQ, DEQ$_f$, or DEQ$_d$ or hybrid version thereof) thereby equalizing the pressure between the adsorption bed undergoing the complementary depressurizing equalization step and the adsorption bed undergoing the dual pressurizing equalization/product pressurization/feed pressurization step at the end of the respective steps.

The characteristics and options disclosed for the dual equalization step and the rinse gas effluent pressurization step apply to the hybrid dual pressurizing equalization/feed pressurization step.

A dual pressurizing equalization/rinse gas effluent pressurization/feed pressurization step is shown in FIGS. 15a and 15b as PEQ$_d$1/REP/FP. Rinse gas effluent gas 92 is introduced counter-currently, feed gas is introduced co-currently, and equalization gas 83 from the bed undergoing a hybrid depressurizing equalization DEQ1/R is introduced both co-currently and counter-currently into the bed undergoing a dual pressurizing equalization/rinse gas effluent pressurization/feed pressurization step.

A dual pressurizing equalization/rinse gas effluent pressurization/feed pressurization step may be added to any known PSA cycle and/or substituted for any pressurizing equalization in any known PSA cycle. The cycle changes may be evaluated using methods, software, and techniques like those described by Mehrotra et al.

Product Pressurization/Feed Pressurization Step (PP/FP)

Product pressurization may be combined with feed pressurization in a hybrid product pressurization/feed pressurization step, abbreviated as "PP/FP." The hybrid product pressurization/feed pressurization step may be added to any known PSA cycle and/or substituted for any product pressurization or feed pressurization step in any known PSA cycle. The cycle changes may be evaluated using methods, software, and techniques like those described by Mehrotra et al.

A product pressurization/feed pressurization step comprises counter-current introduction of product gas with contemporaneous co-current introduction of feed gas.

The characteristics and options disclosed for the product pressurization step and the feed pressurization step apply to the hybrid product pressurization/feed pressurization step.

A product pressurization/feed pressurization step is shown in FIGS. 2a and 2b of US2013/0239807 as "repr" when the optional introduction of feed gas 81 is included.

A product pressurization/feed pressurization step may be added to any known PSA cycle and/or substituted for any product pressurization step and/or feed pressurization step in any known PSA cycle. The cycle changes may be evaluated using methods, software, and techniques like those described by Mehrotra et al.

Rinse Gas Effluent Pressurization/Feed Pressurization (REP/FP) Step

Rinse gas effluent pressurization may be combined with feed pressurization in a hybrid rinse gas effluent pressurization/feed pressurization step, abbreviated as "REP/FP."

A rinse gas effluent pressurization/feed pressurization step comprises counter-current introduction of rinse gas effluent with contemporaneous co-current introduction of feed gas.

The characteristics and option disclosed for the rinse gas effluent pressurization step and the feed pressurization step apply to the hybrid rinse gas effluent pressurization/feed pressurization step.

A hybrid rinse gas effluent pressurization/feed pressurization step is shown in 15a and 15b of US2013/0239807 as "repr" when the optional introduction of feed gas 81 is included and all of the product gas from the feed step is withdrawn as product with none used for repressurization.

A hybrid rinse gas effluent pressurization/feed pressurization step may be added to any known PSA cycle and/or substituted for any feed pressurization step in any known PSA cycle. The cycle changes may be evaluated using methods, software, and techniques like those described by Mehrotra et al.

Depressurizing Equalization/Supply Purge Gas Step (DEQ/SPG)

Depressurizing equalization may be combined with supplying purge gas in a hybrid depressurizing equalization/supply purge gas step, abbreviated "DEQ/SPG," or "DEQ#/SPG", where # is an integer number depending on how many depressurizing equalization steps are present in the PSA cycle.

A depressurizing equalization/supply purge gas step comprises co-currently withdrawing a gas from the adsorption bed undergoing the depressurizing equalization/supply purge gas step and passing a first portion of the gas to an adsorption bed undergoing a complementary pressurizing equalization step (e.g. PEQ, PEQ$_f$ or PEQ$_d$) or a hybrid step thereof, thereby equalizing the pressure between the adsorption bed undergoing the depressurizing equalization/rinse step and the adsorption bed undergoing the complementary pressurizing equalization step (PEQ, PEQ$_f$ or PEQ$_d$ including hybrid forms thereof), and passing a second portion of the gas as a purge gas to an adsorption bed undergoing a purge step (PRG).

A depressurizing equalization/supply purge gas step is shown, for example, as eq5d* in FIG. 16b of US2013/0239807, where gas 94 is passed both to a bed undergoing a purge step (purge) and another undergoing a pressurizing equalization step, (eq5r).

U.S. Pat. No. 6,379,431 (EP1486245) also shows a hybrid DEQ/SPG step in Table 3. Gas is withdrawn from a bed undergoing the hybrid DEQ/SPG step (identified as P' in Table 3) and a first portion is passed to an adsorption bed as pressure equalization gas for equalization therewith (identified as 4' in Table 3) and a second portion is passed as purge gas to another adsorption bed undergoing the purge step (identified as G in Table 3).

The supply purge step, SPG, may also be combined with a counter-current depressurization equalization step, DEQ$_f$, or a dual depressurizing equalization step, DEQ$_d$, in corresponding hybrid steps.

A depressurizing equalization/supply purge gas step may be added to any known PSA cycle and/or substituted for any depressurizing equalization and/or supply purge gas step in any known PSA cycle. The cycle changes may be evaluated using methods, software, and techniques like those described by Mehrotra et al.

Depressurizing Equalization/Blowdown Step (DEQ/BD)

Depressurizing equalization may be combined with blowdown in a hybrid depressurizing equalization/blowdown step, abbreviated "DEQ/BD" or "DEQ#/BD", where # is an integer number depending on how many depressurizing equalization steps are present in the PSA cycle.

The depressurizing equalization/blowdown step comprises counter-current blowdown with contemporaneous co-current withdrawal of pressure equalization gas to an adsorption bed undergoing a complementary pressurizing equalization step (e.g. PEQ, $PEQ_f$ or $PEQ_d$) or a hybrid step thereof, thereby equalizing the pressure between the adsorption bed undergoing the depressurizing equalization/rinse step and the adsorption bed undergoing the complementary pressurizing equalization step (PEQ, $PEQ_f$ or $PEQ_d$ including hybrid forms thereof).

A depressurizing equalization/blowdown step is shown for example in Table 2 of US 2012/0174776. Bed B1 at step 9 is undergoing an E4/BD1 step where the bed is undergoing a blowdown while simultaneously equalizing with the adsorption bed undergoing the E4' step.

Various blowdown steps, BD, $BD_p$, $BD_d$, may also be combined with a counter-current depressurization equalization step, $DEQ_f$, or a dual depressurizing equalization step, $DEQ_d$, in corresponding hybrid steps.

A depressurizing equalization/blowdown step may be added to any known PSA cycle and/or substituted for any depressurizing equalization and/or blowdown step in any known PSA cycle. The cycle changes may be evaluated using methods, software, and techniques like those described by Mehrotra et al.

Supply Purge Gas/Blowdown (SPG/BD)

A supply purge gas step may be combined with blowdown in a supply purge gas/blowdown step, abbreviated "SPG/BD".

The hybrid supply purge gas/blowdown step comprises counter-current blowdown where blowdown gas is withdrawn along with contemporaneous co-currently withdrawing a purge gas from an adsorption bed undergoing the supply purge gas/blowdown step, and passing the purge gas from the adsorption bed undergoing the hybrid supply purge gas/blowdown step to an adsorption bed undergoing a purge step (PRG).

A supply purge gas/blowdown step is shown, for example, in U.S. Pat. No. 8,496,733, incorporated herein by reference, in Table 2 as PPG3/BD1, and is described in the text as the third provide purge gas/first blowdown.

A hybrid supply purge gas/blowdown step may be added to any known PSA cycle and/or substituted for any supply purge gas and/or blowdown step in any known PSA cycle. The cycle changes may be evaluated using methods, software, and techniques like those described by Mehrotra et al.

Intermediate Storage Tanks

Any of the steps where gas is passed from one adsorption bed to another adsorption may be augmented through the use of one or more intermediate storage tanks. Use of an intermediate storage tank allows for the cycle to be asynchronous and provides flexibility in the duration of the various steps. Intermediate storage tanks may be designed to spatially hold the impurity profile of the gas exiting an adsorption bed, then introducing the profile in reverse order to the adsorption bed receiving the gas.

In some literature, a particular PSA cycle step is described as being multiple steps, while in others it is described as a single step. For example, the 4 bed PSA cycle described in Table 2 of U.S. Pat. No. 7,537,742 is shown to have multiple production steps (i.e. AD1, AD2, and AD3 in Table 2 and reproduced in FIG. 16a as P1, P2, and P3) and multiple product pressurization steps PP1, PP2. This same PSA cycle can also be described as having a single production step and a single product pressurization step. FIG. 16b shows the equivalent PSA cycle for a 4 bed system represented in different ways depending on the convention used.

The same 4 bed cycle can be further abbreviated simply as P, DEQ1, SPG, DEQ2, BD, PRG, PEQ2, PEQ1, PP. The skilled person can readily determine the relation of the steps between the 4 beds.

A pressure swing adsorption system may be operated using multiple pressure swing adsorption cycles to control the buildup of secondary components on the adsorbent as described in U.S. Pat. No. 8,394,171, incorporated herein by reference.

BRIEF SUMMARY

The present invention relates to a process for separating a primary gas component from a feed gas mixture comprising the primary gas component and secondary gas components in a plurality of twelve adsorption beds in total, each adsorption bed containing an adsorbent selective for the secondary gas components.

There are several aspects of the invention as outlined below. In the following, specific aspects of the invention are outlined below.

Aspect 1. A process comprising subjecting each of the plurality of adsorption beds to at least one of a first repetitive cycle and a second repetitive cycle, the first repetitive cycle comprising, in sequence, (a) a production step or hybrid step thereof, (b) a plurality of five depressurizing equalization steps, (c) a supply purge gas step, (d) a blowdown step, (e) a purge step, (f) a plurality of five pressurizing equalization steps, and (g) a repressurization step, and the second repetitive cycle comprising, in sequence, (a) a production step or hybrid step thereof, (b) a plurality of five depressurizing equalization steps, (c/d) a hybrid supply purge gas/blowdown step, (e) a purge step, (f) a plurality of five pressurizing equalization steps, and (g) a repressurization step.

Aspect 2. The process of aspect 1 wherein:
(i) the duration of the production step is 23% to 27% of the cycle time of the first repetitive cycle or the duration of the purge step is 23% to 27% of the cycle time of the first repetitive cycle when the adsorption beds are subjected to the first repetitive cycle; and
(ii) the duration of the purge step is 23% to 27% of the cycle time of the second repetitive cycle when the adsorption beds are subjected to the second repetitive cycle.

Aspect 3. The process of aspect 1 or aspect 2 wherein the primary gas component is $H_2$ and the secondary gas components comprise at least two of CO, $CO_2$, $CH_4$, and $N_2$.

Aspect 4. The process of any one of the preceding aspects wherein the first pressurizing equalization step further comprises at least one of (i) co-currently introducing the feed gas mixture into the adsorption bed undergoing the first pressurizing equalization step simultaneous with the counter-current introduction of the pressure equalization gas from the adsorption bed undergoing the first depressurizing equalization bed, and (ii) counter-currently introducing product gas from at least one of the adsorption beds undergoing the feed step into the adsorption bed undergoing the first pressurizing equalization step simultaneous with the counter-current introduction of the pressure equalization gas from the adsorption bed undergoing the first depressurizing equalization bed.

Aspect 5. The process of any one of the preceding aspects wherein the purge step (e) comprises counter-currently introducing the purge gas from the adsorption bed undergoing the fifth depressurizing equalization step into the adsorption bed undergoing the purge step and the fifth depressurizing equalization step further comprises passing a second portion of the effluent gas from the adsorption bed undergoing the fifth depressurizing equalization step to at least one of the adsorption beds undergoing the purge step as the purge gas.

Aspect 6. The process of any one of aspects 1-5 wherein the process comprises subjecting each of the plurality of adsorption beds to the first repetitive cycle.

Aspect 7. The process of aspect 6 wherein the first repetitive cycle further comprises an idle step between the fifth depressurizing equalization step of the plurality of five depressurizing equalization steps and the supply purge gas step.

Aspect 8. The process of any one of aspects 1-5 wherein the process comprises subjecting each of the plurality of adsorption beds to the second repetitive cycle.

Aspect 9. The process of aspect 8 wherein the second repetitive cycle further comprises an idle step between the fifth depressurizing equalization step of the plurality of five depressurizing equalization steps and the hybrid supply purge gas/blowdown step.

Aspect 10. The process of any one of aspects 1-9 wherein at least one of the plurality of five depressurizing equalization steps is a parallel depressurizing equalization step and at least one of the plurality of five pressurizing equalization steps is a parallel pressurizing equalization step.

Aspect 11. The process of any one of aspects 1-9 wherein at least one of the plurality of five pressurizing equalization steps is a hybrid pressurizing equalization/feed pressurization step.

Aspect 12. The process of any one of aspects 1-9 wherein at least one of the plurality of five pressurizing equalization steps is a hybrid pressurizing equalization/product pressurization step.

BRIEF DESCRIPTION OF SEVERAL VIEWS OF THE DRAWINGS

FIG. 2a is a pressure swing adsorption cycle chart for a 4 adsorption bed cycle having a single co-current depressurizing equalization step with complementary counter-current pressurizing equalization step. FIG. 2b is a schematic illustrating the direction of gas flows for the cycle chart of FIG. 2a.

Figure 3:
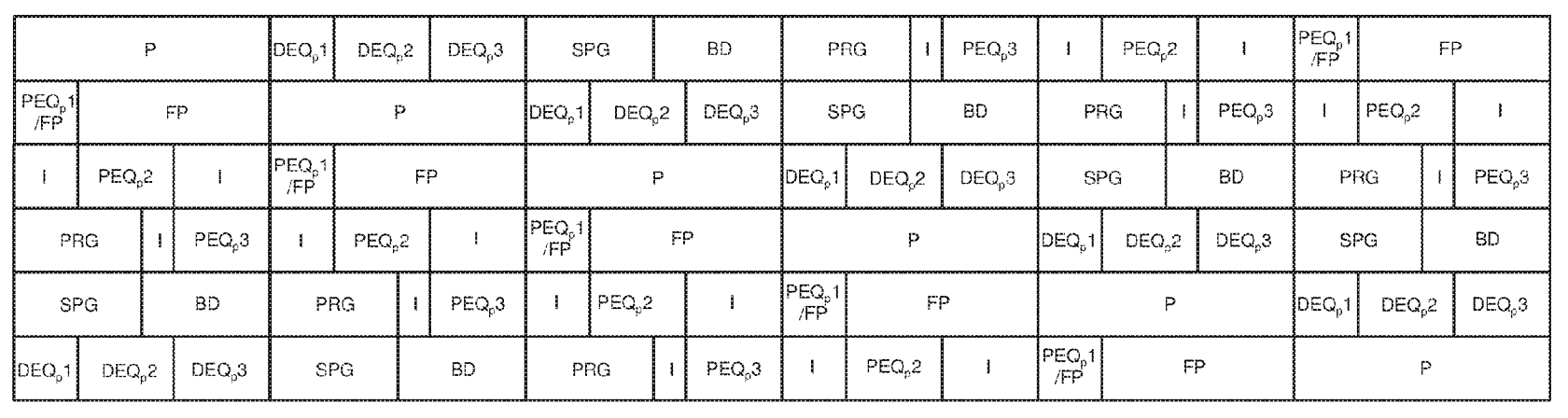

FIG. 3 is a pressure swing adsorption cycle chart for a 6 adsorption bed cycle showing that the timing of the cycle steps do not need to align with each other exactly.

FIG. 4a is a pressure swing adsorption cycle chart for a 4 adsorption bed cycle having a counter-current depressurizing equalization step with complementary co-current pressurizing equalization step, a co-current blowdown step, and a dual product pressurization step. FIG. 4b is a schematic illustrating the direction of gas flows for the cycle chart of FIG. 4a.

FIG. 5a is a pressure swing adsorption cycle chart for a 4 adsorption bed cycle having a dual depressurizing equalization step with complementary dual pressurizing equalization step, a dual blowdown step, and a co-current product pressurization step. FIG. 5b is a schematic illustrating the direction of gas flows for the cycle chart of FIG. 5a.

FIG. 6a is a pressure swing adsorption cycle chart for a 4 adsorption bed cycle having a hybrid production/rinse step, and a feed pressurization step. FIG. 6b is a schematic illustrating the direction of gas flows for the cycle chart of FIG. 6a.

FIG. 7a is a pressure swing adsorption cycle chart for a 4 adsorption bed cycle having a hybrid production/rinse/supply product step, and a product pressurization step. FIG. 7b is a schematic illustrating the direction of gas flows for the cycle chart of FIG. 7a.

FIG. 8a is a pressure swing adsorption cycle chart for a 4 adsorption bed cycle having a hybrid production/supply product step, a hybrid co-current pressurizing equalization/feed pressurization step, and a hybrid product pressurization/feed pressurization step. FIG. 8b is a schematic illustrating the direction of gas flows for the cycle chart of FIG. 8a.

FIG. 9a is a pressure swing adsorption cycle chart for a 4 adsorption bed cycle having a hybrid production/supply product step, a dual depressurizing equalization step, a dual blowdown step, a hybrid dual pressurizing equalization/feed pressurization step, and a product pressurization step. FIG. 9b is a schematic illustrating the direction of gas flows for the cycle chart of FIG. 9a.

FIG. 10a is a pressure swing adsorption cycle chart for a 4 adsorption bed cycle having a hybrid production/supply product step, a counter-current depressurizing equalization step, a hybrid co-current pressurizing equalization/product pressurization step, and a hybrid product pressurization/feed pressurization step. FIG. 10b is a schematic illustrating the direction of gas flows for the cycle chart of FIG. 10a.

FIG. 11a is a pressure swing adsorption cycle chart for a 4 adsorption bed cycle having a hybrid production/supply product step, a dual depressurizing equalization step, a supply purge gas step, a dual blowdown step, a purge step, a hybrid dual pressurizing equalization/product pressurization step, and a product pressurization step. FIG. 11b is a schematic illustrating the direction of gas flows for the cycle chart of FIG. 11a.

FIG. 12a is a pressure swing adsorption cycle chart for a 4 adsorption bed cycle having a counter-current depressurizing equalization step, and a hybrid co-current pressurizing equalization/product pressurization/feed pressurization step. FIG. 12b is a schematic illustrating the direction of gas flows for the cycle chart of FIG. 12a.

FIG. 13a is a pressure swing adsorption cycle chart for a 4 adsorption bed cycle having a dual depressurizing equalization step, and a hybrid dual pressurizing equalization/product pressurization/feed pressurization step. FIG. 13b is a schematic illustrating the direction of gas flows for the cycle chart of FIG. 13a.

FIG. 14a is a pressure swing adsorption cycle chart for a 10 adsorption bed cycle having a hybrid co-current depressurizing equalization/rinse step, and a hybrid co-current pressurizing equalization/rinse gas effluent pressurization/feed pressurization step. FIG. 14b is a schematic illustrating the direction of gas flows for the cycle chart of FIG. 14a.

FIG. 15a is a pressure swing adsorption cycle chart for a 10 adsorption bed cycle having a hybrid co-current depressurizing equalization/rinse step, and a hybrid dual pressurizing equalization/rinse gas effluent pressurization/feed pressurization step. FIG. 15b is a schematic illustrating the direction of gas flows for the cycle chart of FIG. 15a.

FIG. 16a is a pressure swing adsorption cycle chart for a 4 adsorption bed cycle where the production step is shown as 3 steps according to one nomenclature convention and FIG. 16b is an equivalent pressure swing adsorption cycle chart where the production step is shown as a single step according to another nomenclature convention.

FIG. 17 is a pressure swing adsorption cycle chart for a 12 adsorption bed cycle having 5 depressurizing equalization steps and 5 pressurizing equalization steps according to the present invention.

FIG. 18 is another pressure swing adsorption cycle chart for a 12 adsorption bed cycle having 5 depressurizing equalization steps and 5 pressurizing equalization steps according to the present invention.

FIG. 19 is another pressure swing adsorption cycle chart for a 12 adsorption bed cycle having 5 depressurizing equalization steps and 5 pressurizing equalization steps according to the present invention.

Figure 20:
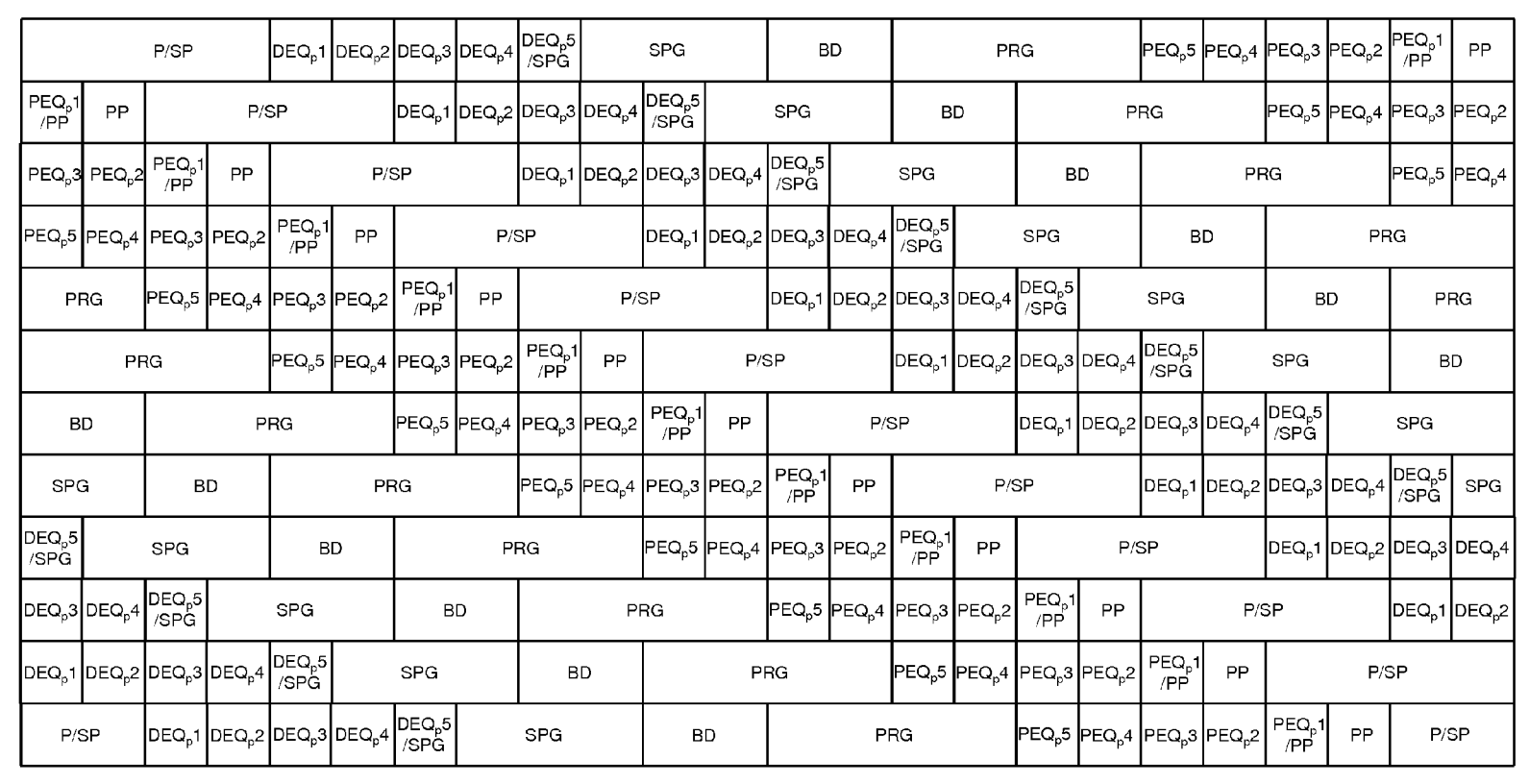

FIG. 20 is another pressure swing adsorption cycle chart for a 12 adsorption bed cycle having 5 depressurizing equalization steps and 5 pressurizing equalization steps according to the present invention.

FIG. 21 is another pressure swing adsorption cycle chart for a 12 adsorption bed cycle having 5 depressurizing equalization steps and 5 pressurizing equalization steps according to the present invention.

Figure 22:
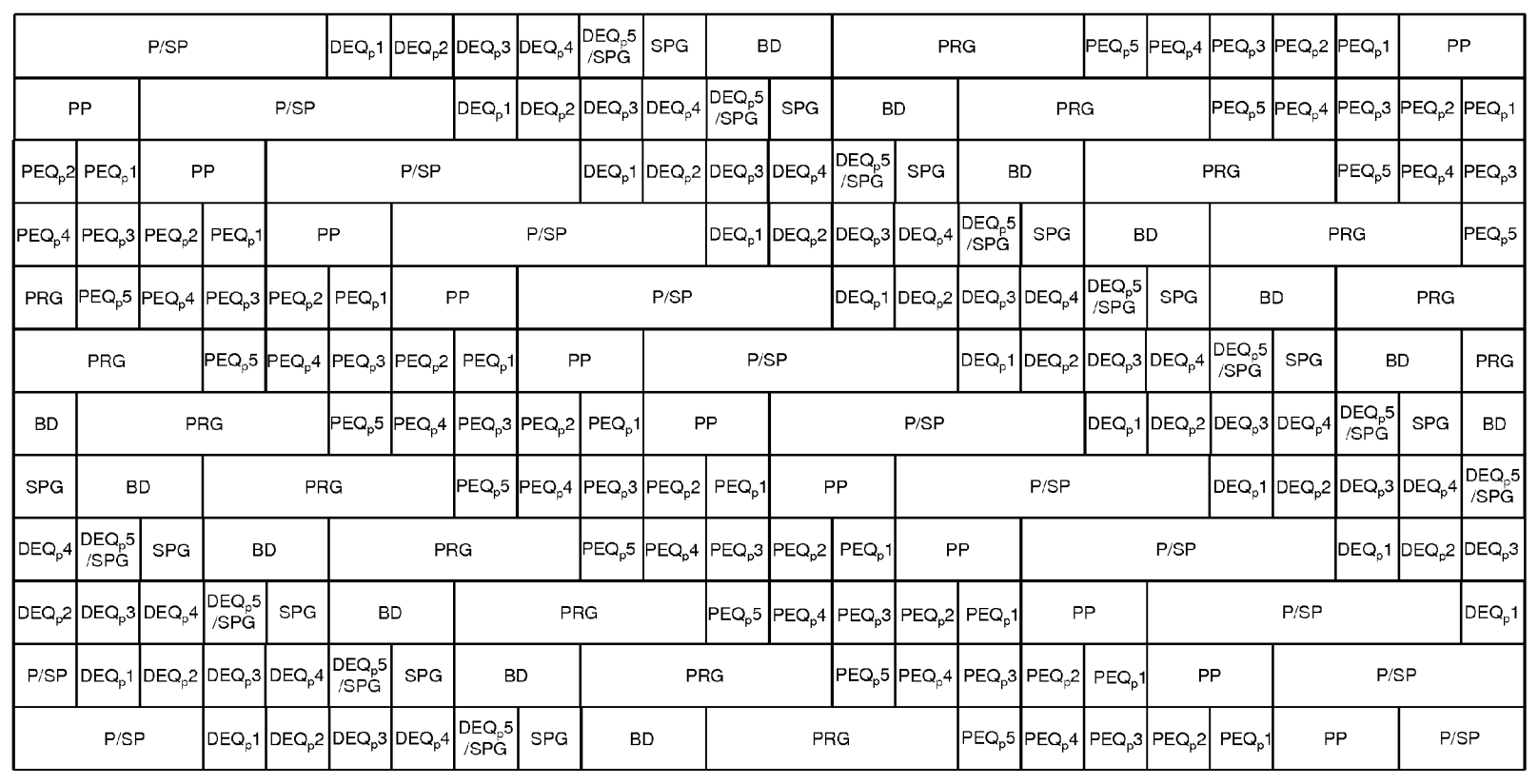

FIG. 22 is another pressure swing adsorption cycle chart for a 12 adsorption bed cycle having 5 depressurizing equalization steps and 5 pressurizing equalization steps according to the present invention.

FIG. 23 is another pressure swing adsorption cycle chart for a 12 adsorption bed cycle having 5 depressurizing equalization steps and 5 pressurizing equalization steps according to the present invention.

DETAILED DESCRIPTION OF THE PREFERRED EMBODIMENTS

Figure 1:
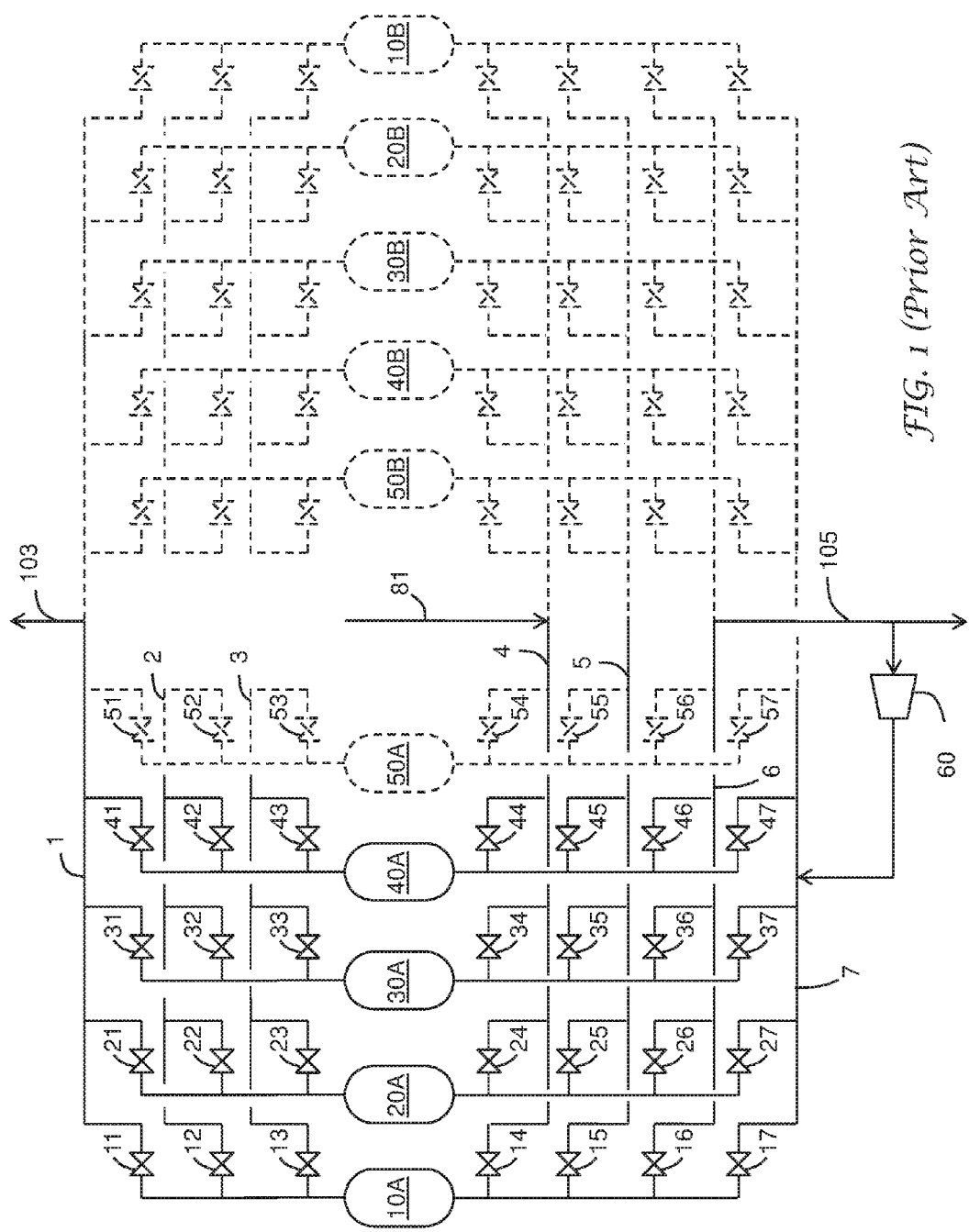
FIG. 1 is a process flow diagram for an adsorption system.
Figure 2:
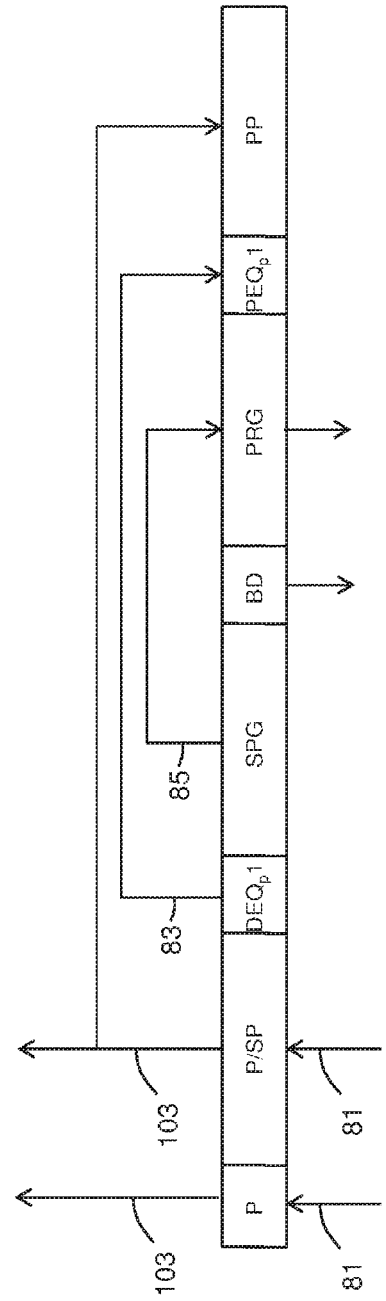
Figures 4A, 4B:
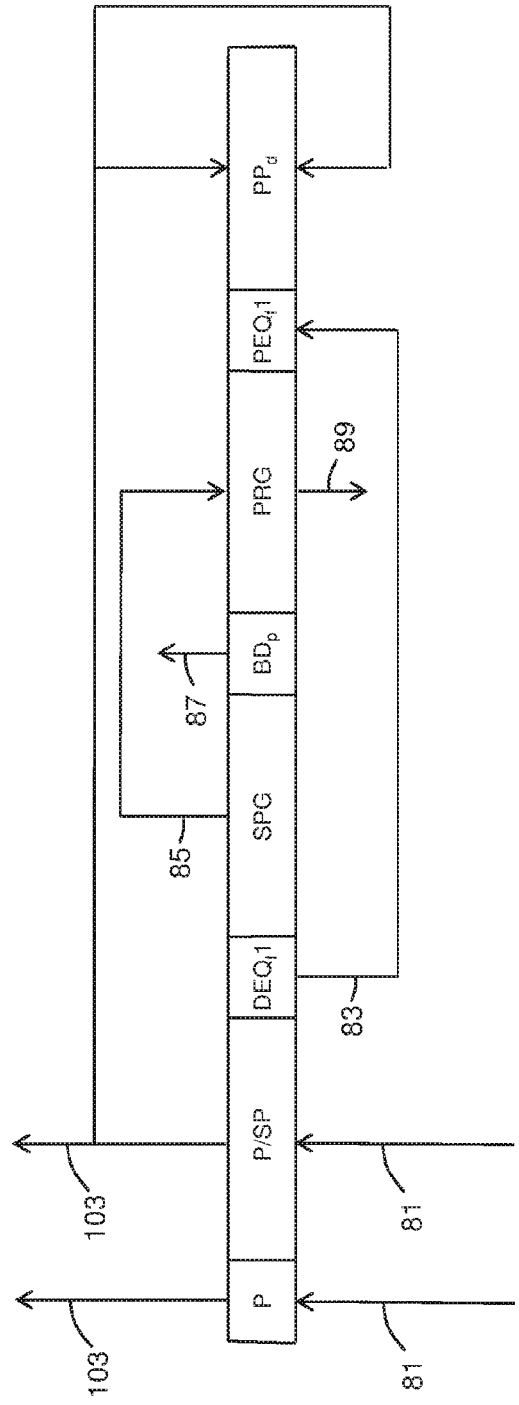
Figures 5A, 5B:
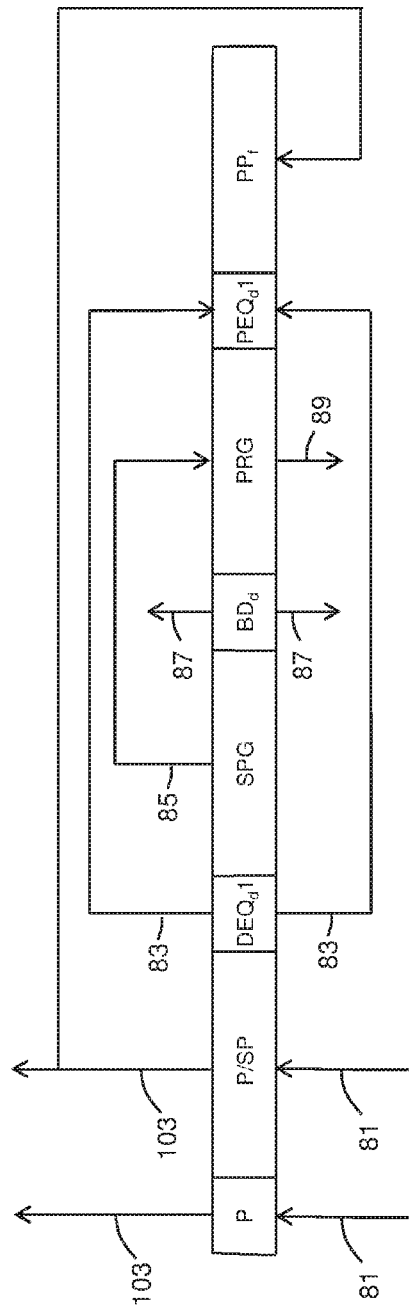
Figures 6A, 6B:
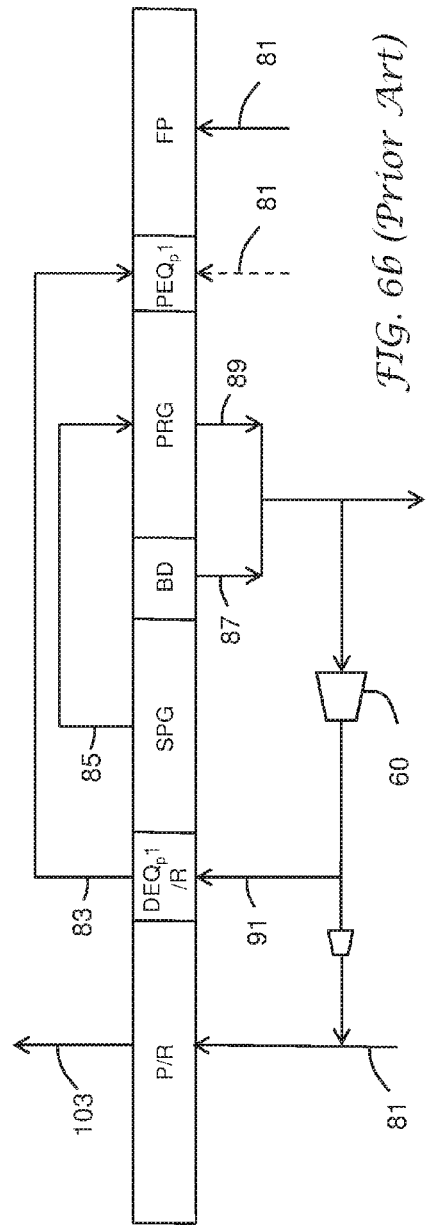
Figures 8A, 8B:
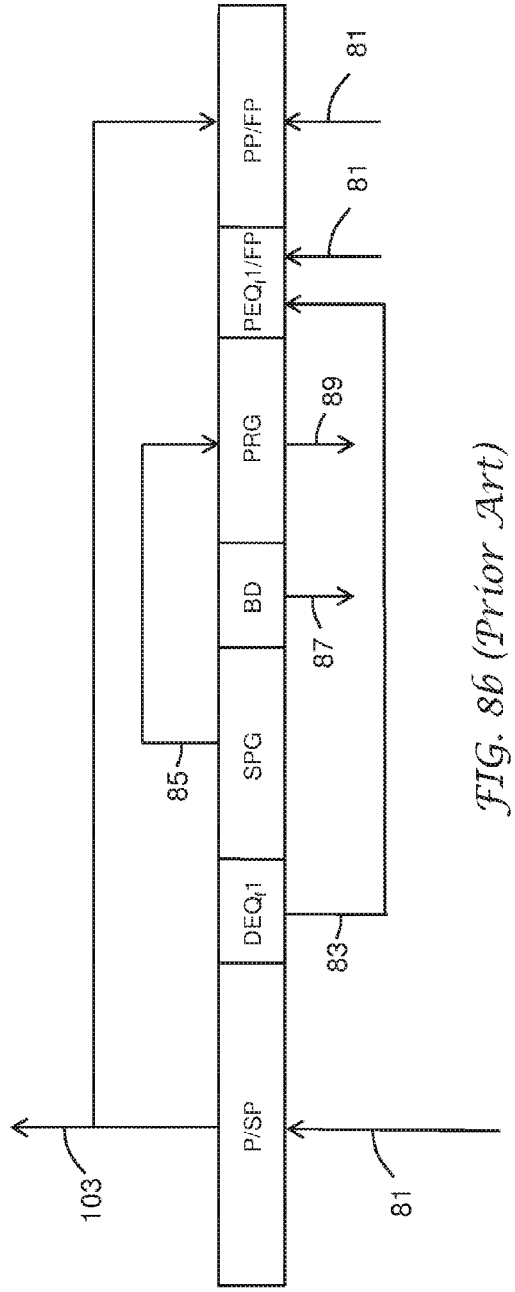
Figures 9A, 9B:
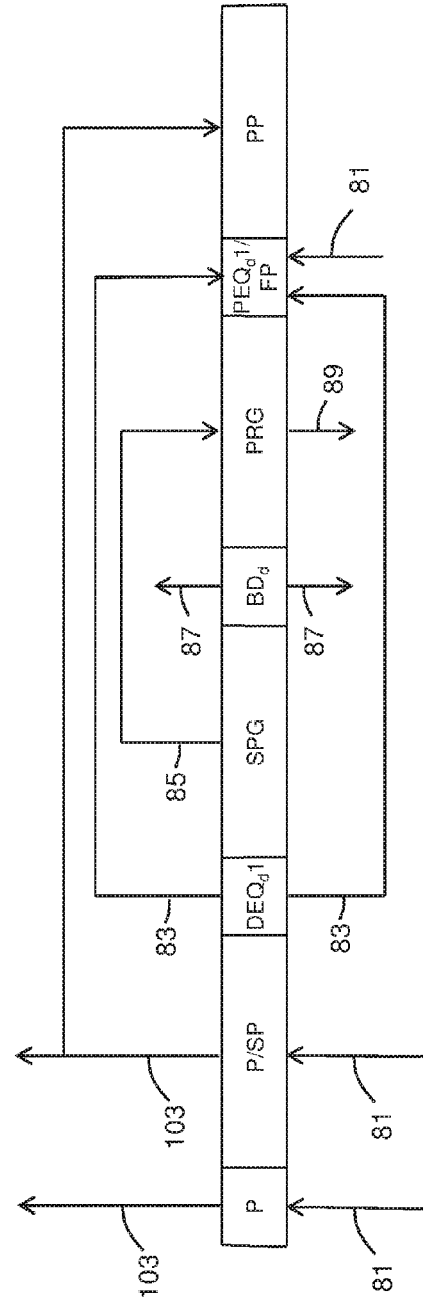
Figures 10A, 10B:
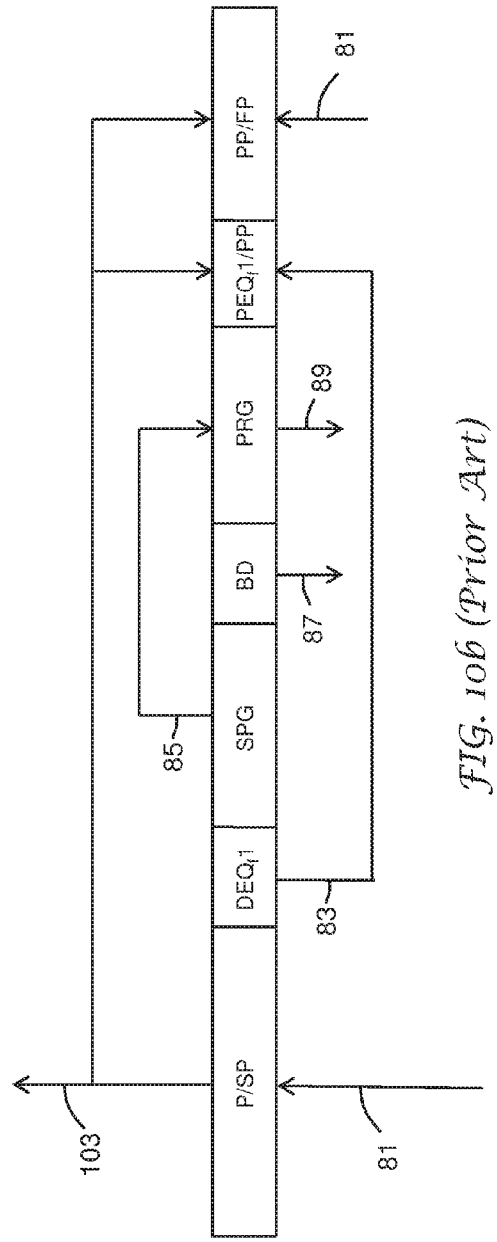
Figures 11A, 11B:
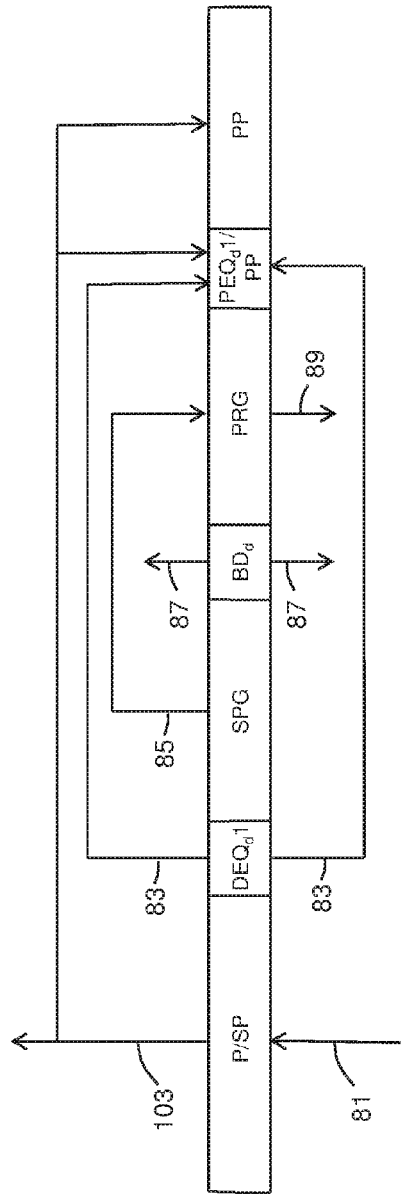
Figures 12A, 12B:
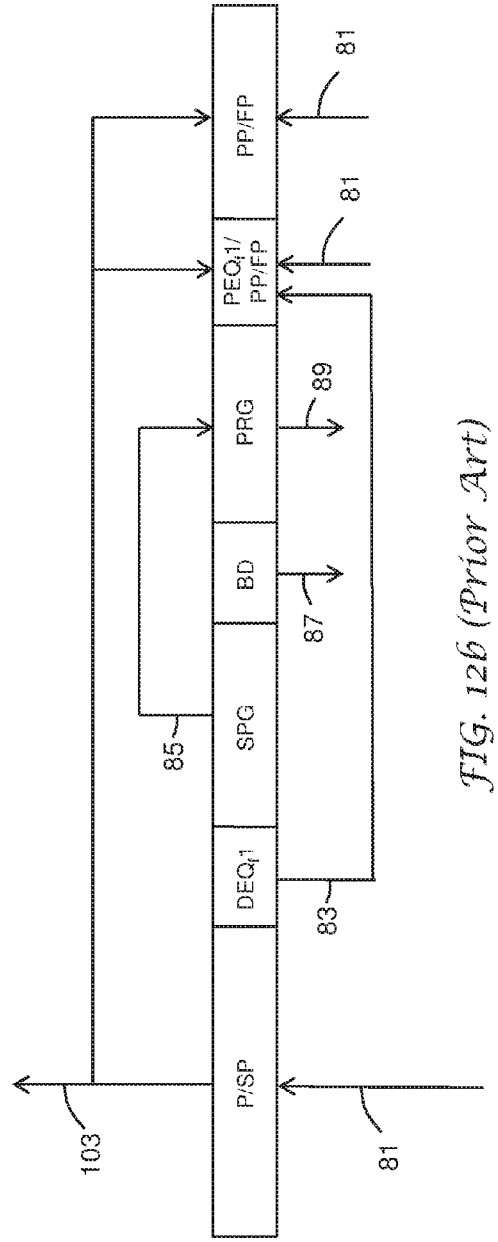
Figures 13A, 13B:
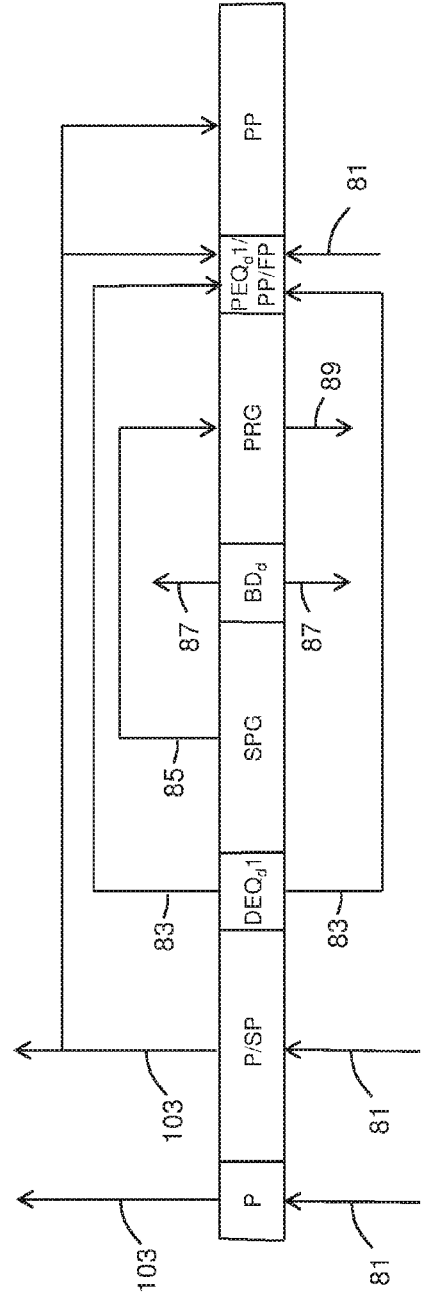
Figures 14A, 14B:
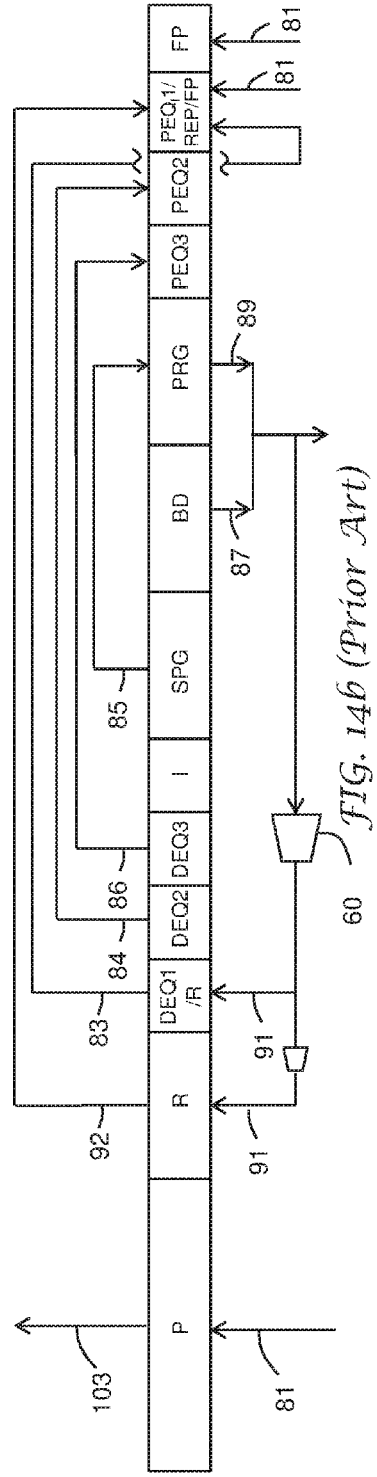
Figures 15A, 15B:
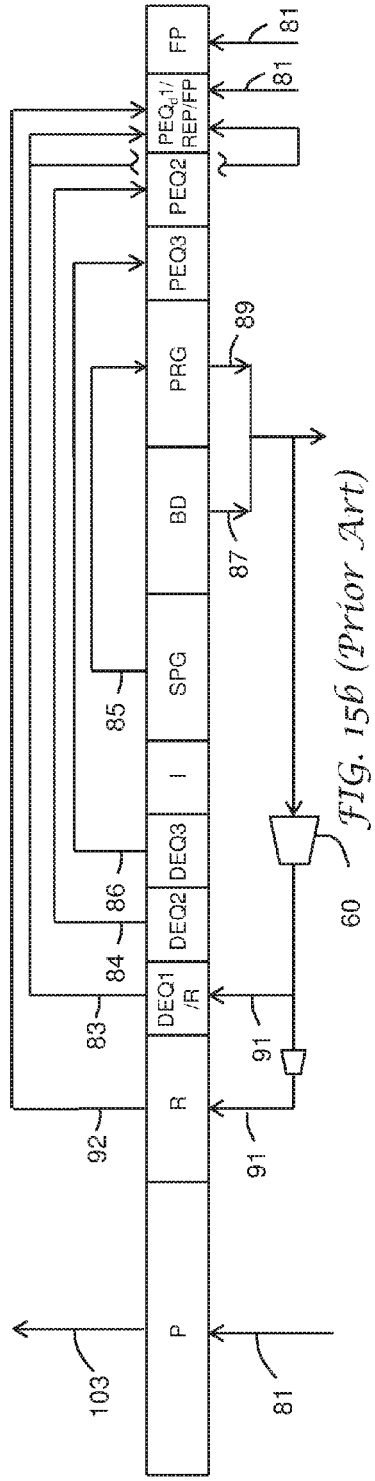

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The term "plurality" means "two or more than two." The phrase "a plurality of three or more" means three or more. The phrase "a plurality of three" means three in total, i.e. three and no more than three.

The phrase "at least a portion" means "a portion or all." The at least a portion of a stream may have the same composition with the same concentration of each of the species as the stream from which it is derived. The at least a portion of a stream may have a different composition to that of the stream from which it is derived. The at least a portion of a stream may include specific components of the stream from which it is derived.

As used herein a "divided portion" of a stream is a portion having the same chemical composition and species concentrations as the stream from which it was taken.

As used herein a "separated portion" of a stream is a portion having a different chemical composition and different species concentrations than the stream from which it was taken.

As used herein, "first," "second," "third," etc. are used to distinguish from among a plurality of steps and/or features, and is not indicative of the total number, or relative position in time and/or space unless expressly stated as such.

In order to aid in describing the invention, directional terms may be used in the specification and claims to describe portions of the present invention (e.g., upper, top, lower, bottom, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the claims, letters may be used to identify claimed steps (e.g. (a), (b), and (c)). These letters are used to aid in referring to the method steps and are not intended to indicate the order in which claimed steps are performed, unless and only to the extent that such order is specifically recited in the claims.

The term "depleted" means having a lesser mole % concentration of the indicated gas than the original stream from which it was formed. "Depleted" does not mean that the stream is completely lacking the indicated gas.

The terms "rich" or "enriched" means having a greater mole % concentration of the indicated gas than the original stream from which it was formed.

The present invention relates to a process for separating a primary gas component from a feed gas mixture comprising the primary gas component and secondary gas components in a plurality of twelve adsorption beds (in total), each adsorption bed containing an adsorbent selective for the secondary gas components. The primary gas component may be $H_2$ and the secondary gas components may comprise at least two of $CO$, $CO_2$, $CH_4$, and $N_2$.

The process comprises subjecting each of the plurality of adsorption beds to at least one of a first repetitive cycle and a second repetitive cycle. The first repetitive cycle comprises, in sequence, (a) a production step or hybrid step thereof, (b) a plurality of five depressurizing equalization steps, (c) a supply purge gas step, (d) a blowdown step, (e) a purge step, (f) a plurality of five pressurizing equalization steps, and (g) a repressurization step. The second repetitive cycle comprises, in sequence, (a) a production step or hybrid step thereof, (b) a plurality of five depressurizing equalization steps, (c/d) a hybrid supply purge gas/blowdown step, (e) a purge step, (f) a plurality of five pressurizing equalization steps, and (g) a repressurization step.

Each of the steps is described in the background section. Preferred embodiments are summarized in FIGS. 17 to 23.

The first repetitive cycle may have a cycle time to execute one complete cycle of the first repetitive cycle. The second repetitive cycle may have a cycle time to execute one complete cycle of the second repetitive cycle.

The production step or hybrid step thereof may comprise introducing the feed gas mixture at a feed gas pressure ranging from 1.0 MPa to 7.0 MPa into an adsorption bed undergoing the production step or hybrid step thereof and adsorbing the secondary gas components on the adsorbent in the adsorption bed undergoing the production step or hybrid step thereof while simultaneously withdrawing a product gas from the adsorption bed undergoing the production step or hybrid step thereof.

Figure 23:
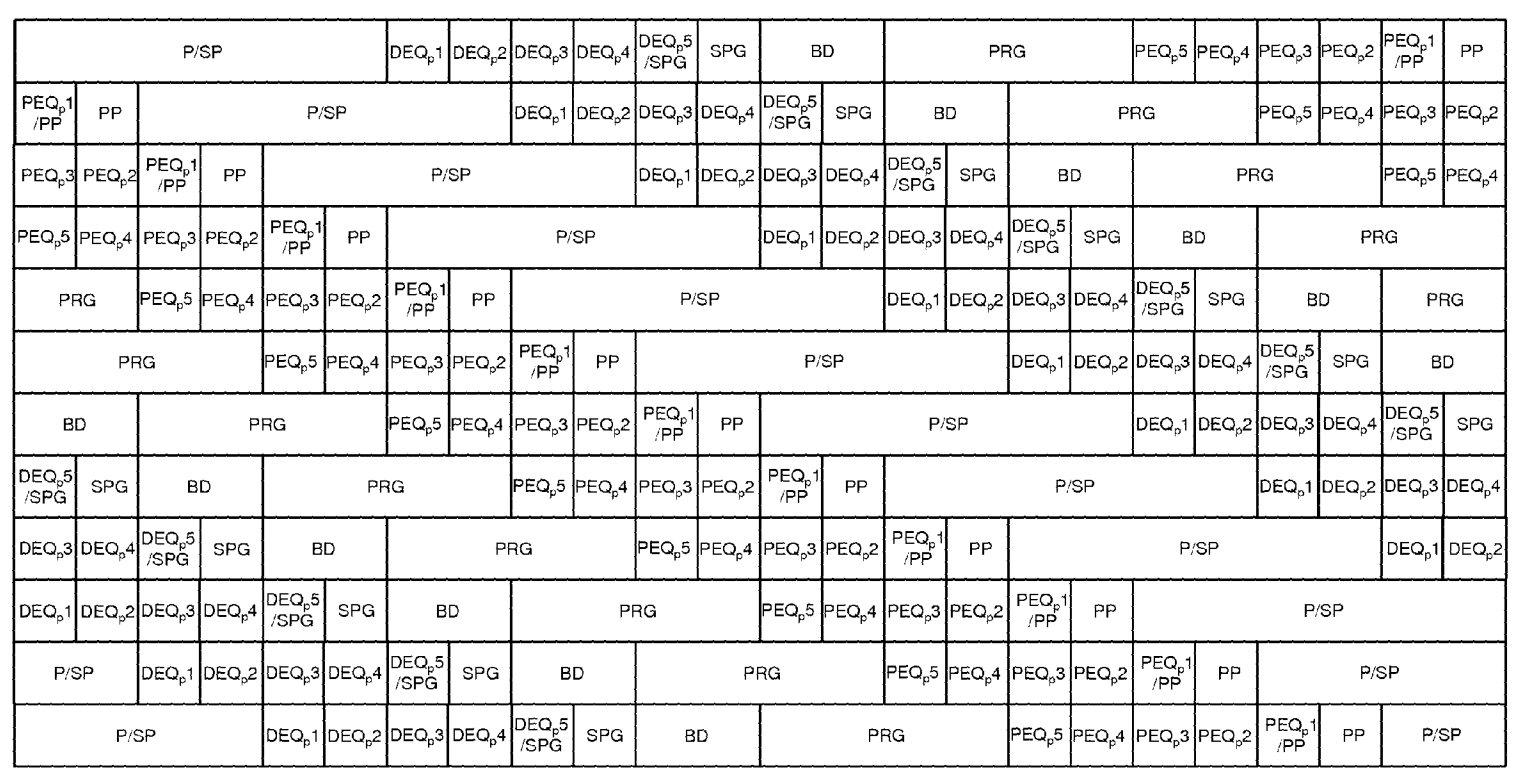

As shown in FIG. 23, the duration of the production step may be about 25% (e.g. 23% to 27%) of the total cycle time of the cycle.

The plurality of five depressurizing equalization steps may comprise, in sequence, a first depressurizing equalization step, a second depressurizing equalization step, a third depressurizing equalization step, a fourth depressurizing equalization step, and a fifth pressure decreasing equalization step.

The first depressurizing equalization step may comprise co-currently withdrawing a pressure equalization gas from an adsorption bed undergoing the first depressurizing equalization step, and passing the pressure equalization gas to an adsorption bed undergoing a first pressurizing equalization step thereby equalizing the pressure between the adsorption bed undergoing the first depressurizing equalization step and the adsorption bed undergoing the first pressurizing equalization step.

The second depressurizing equalization step may comprise co-currently withdrawing a pressure equalization gas from an adsorption bed undergoing the second depressurizing equalization step, and passing the pressure equalization gas from the adsorption bed undergoing the second depressurizing equalization step to an adsorption bed undergoing a second pressurizing equalization step thereby equalizing the pressure between the adsorption bed undergoing the second depressurizing equalization step and the adsorption bed undergoing the second pressurizing equalization step.

The third depressurizing equalization step may comprise co-currently withdrawing a pressure equalization gas from an adsorption bed undergoing the third depressurizing equalization step, and passing the pressure equalization gas from the adsorption bed undergoing the third depressurizing equalization step to an adsorption bed undergoing a third pressurizing equalization step thereby equalizing the pressure between the adsorption bed undergoing the third depressurizing equalization step and the adsorption bed undergoing the third pressurizing equalization step.

The fourth depressurizing equalization step may comprise co-currently withdrawing a pressure equalization gas from an adsorption bed undergoing the fourth depressurizing equalization step, and passing the pressure equalization gas from the adsorption bed undergoing the fourth depressurizing equalization step to an adsorption bed undergoing a fourth pressurizing equalization step thereby equalizing the pressure between the adsorption bed undergoing the fourth depressurizing equalization step and the adsorption bed undergoing the fourth pressurizing equalization step.

The fifth depressurizing equalization step may comprise co-currently withdrawing an effluent gas from an adsorption bed undergoing the fifth depressurizing equalization step, and passing at least a portion of the effluent gas from the adsorption bed undergoing the fifth depressurizing equalization step as pressure equalization gas to an adsorption bed undergoing a fifth pressurizing equalization step thereby equalizing the pressure between the adsorption bed undergoing the fifth depressurizing equalization step and the adsorption bed undergoing the fifth pressurizing equalization step.

The supply purge gas step may comprise co-currently withdrawing a purge gas from an adsorption bed undergoing the supply purge gas step, and passing the purge gas from the adsorption bed undergoing the supply purge gas step to the adsorption beds undergoing the purge step.

Figure 17:
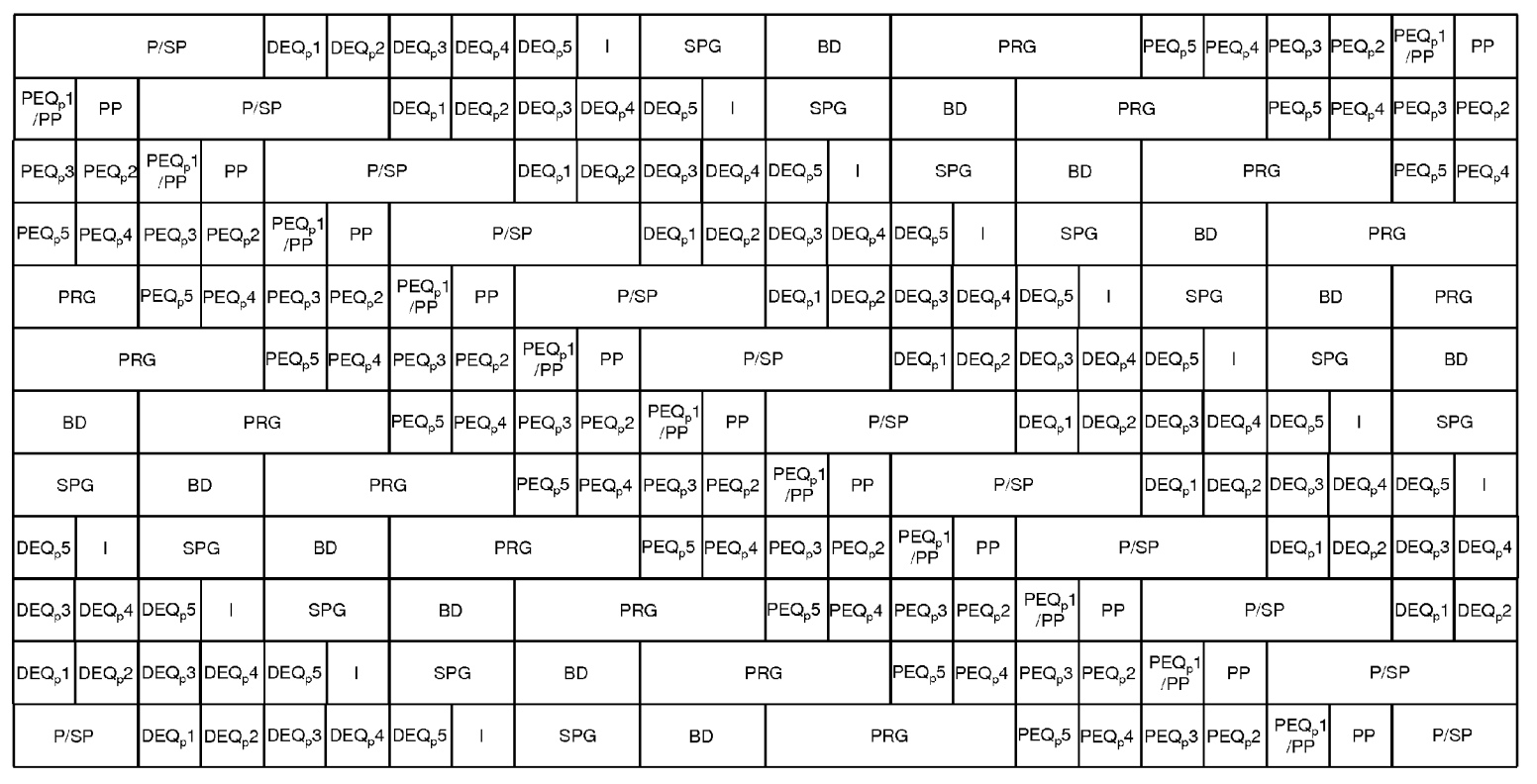

The first repetitive cycle may further comprise an idle step between the fifth depressurizing equalization step of the plurality of five depressurizing equalization steps and the supply purge gas step as shown in FIG. 17.

The blowdown step may comprise counter-currently withdrawing a blowdown gas from an adsorption bed undergoing the blowdown step, the blowdown gas having a concentration of the primary gas component that is lower than the concentration of the primary gas component in the feed gas mixture.

Figure 21:
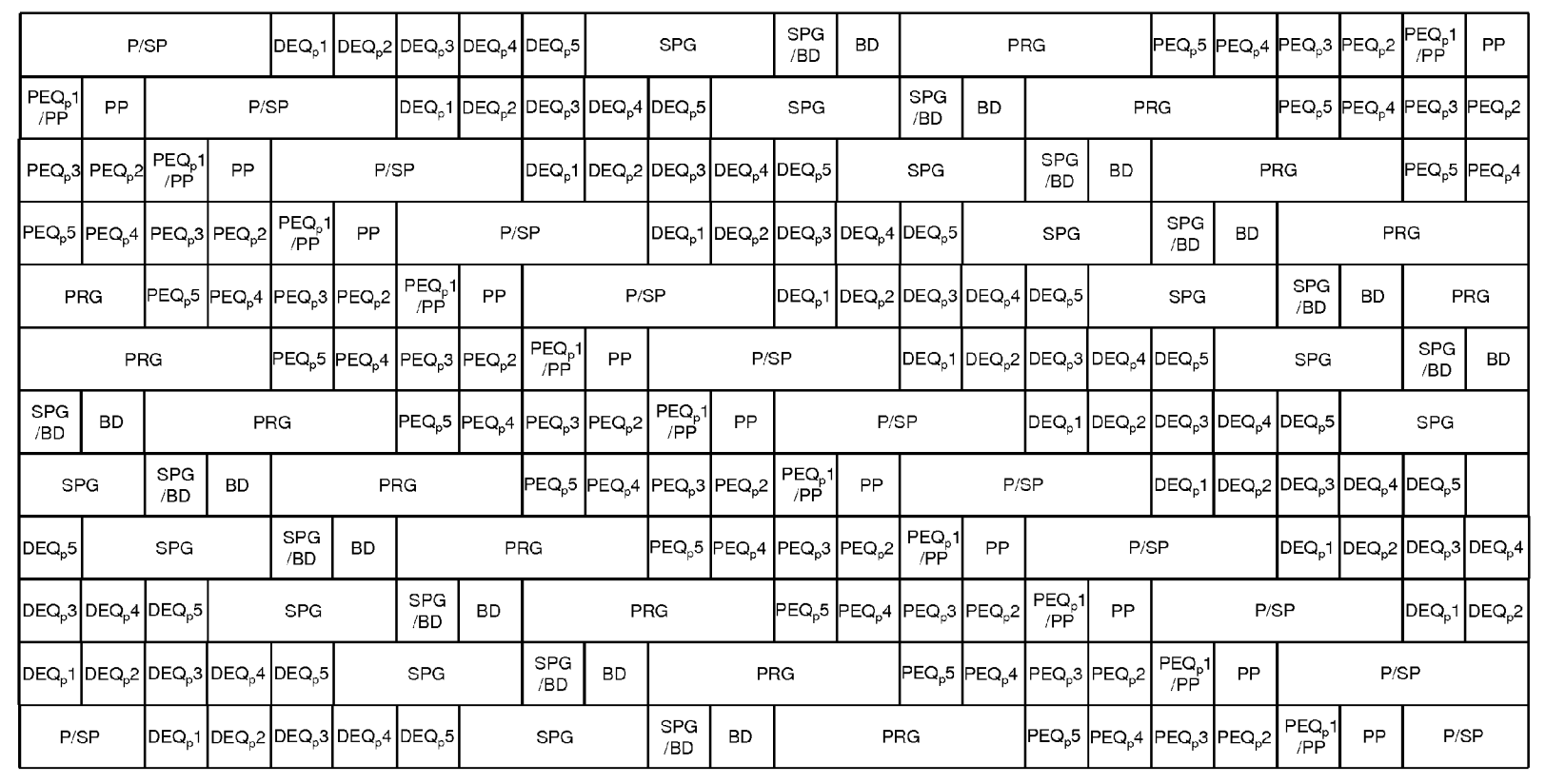

The hybrid supply purge gas/blowdown step may comprise co-currently withdrawing a purge gas from an adsorption bed undergoing the hybrid supply purge gas/blowdown step, and passing the purge gas from the adsorption bed undergoing the hybrid supply purge gas/blowdown step to an adsorption bed undergoing the purge step while simultaneously counter-currently withdrawing a blowdown gas from the adsorption bed undergoing the hybrid supply purge gas/blowdown step, the blowdown gas having a concentration of the primary gas component that is lower than the concentration of the primary gas component in the feed gas mixture. The hybrid supply purge gas/blowdown step is shown in FIG. 19 and FIG. 21.

Figure 19:
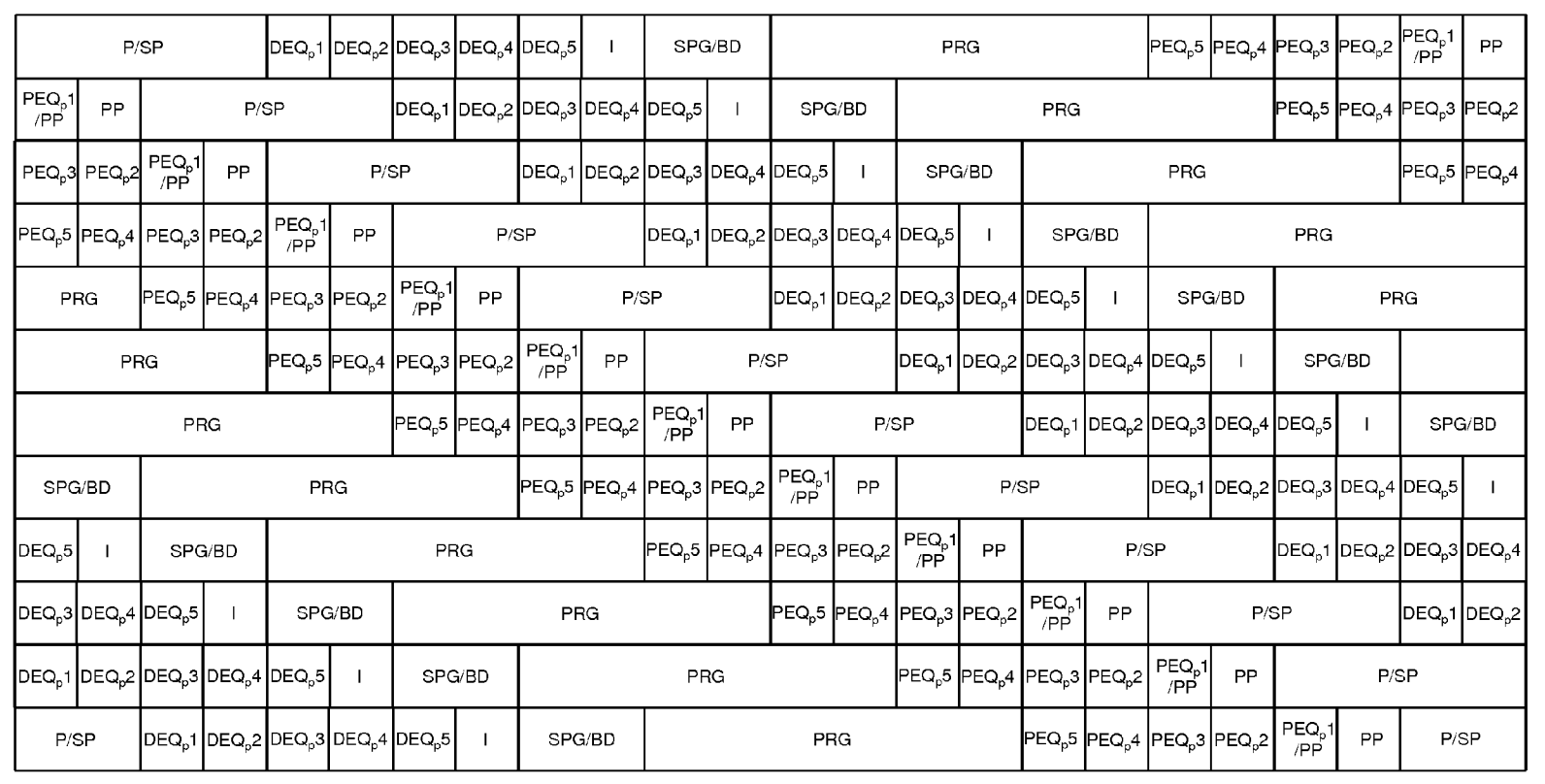

The second repetitive cycle may further comprise an idle step between the fifth depressurizing equalization step of the plurality of five depressurizing equalization steps and the hybrid supply purge gas/blowdown step as shown in FIG. 19.

The purge step may comprise counter-currently introducing at least one of (i) the purge gas from the adsorption bed undergoing the supply purge gas step (FIGS. 17, 18, 20, 21, 22, and 23), (ii) the purge gas from the hybrid supply purge gas/blowdown step (FIGS. 19, and 21), and (iii) a purge gas from the adsorption bed undergoing the fifth depressurizing equalization step (FIGS. 18, 20, 22, and 23) into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture.

Figure 18:
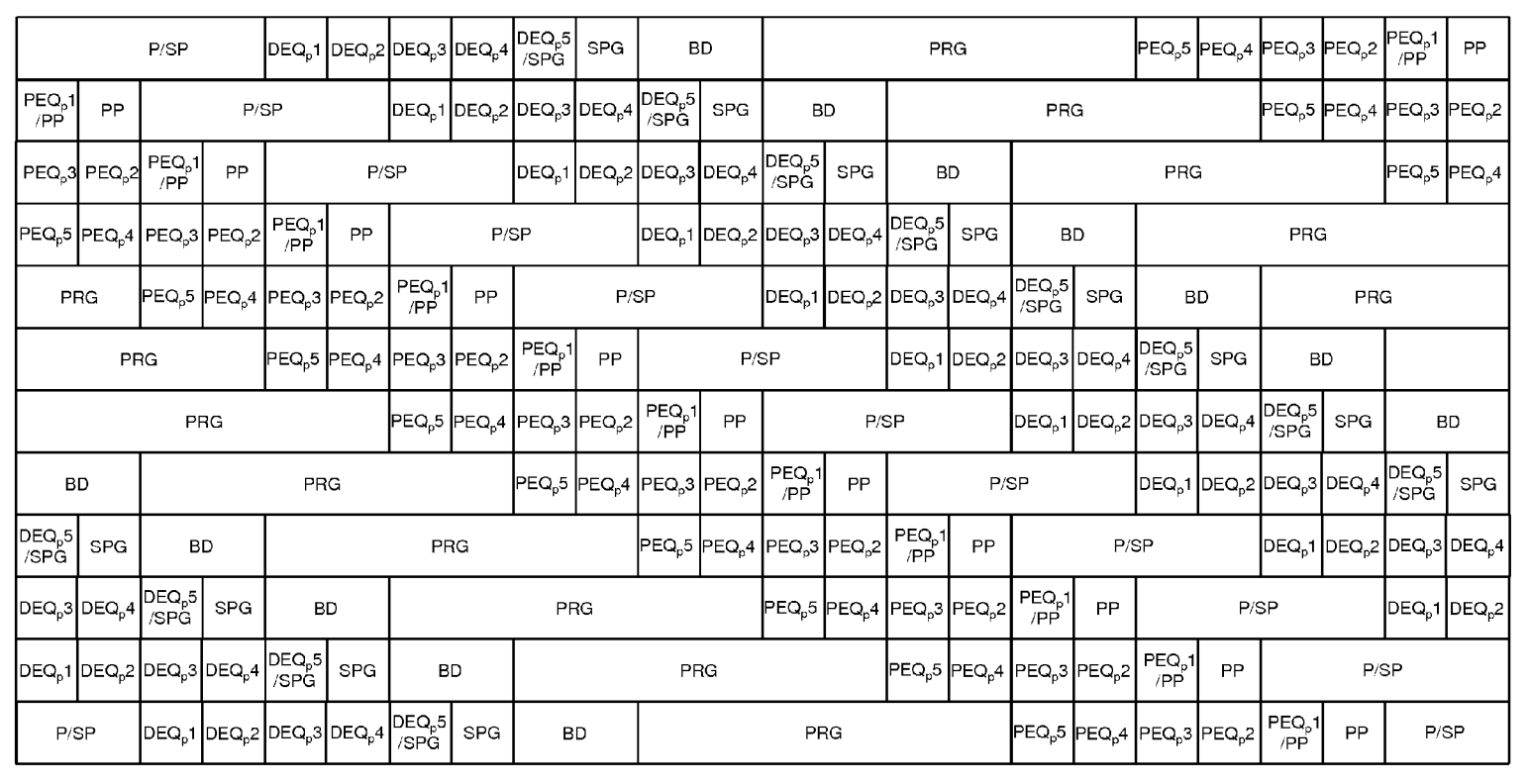

As shown in FIGS. 18 and 19, the duration of the purge step may be about 25% (e.g. 23% to 27%) of the total cycle time of the cycle.

The plurality of five pressurizing equalization steps may comprise, in sequence, the fifth pressurizing equalization step, the fourth pressurizing equalization step, the third pressurizing equalization step, the second pressurizing equalization step, and the first pressurizing equalization step.

The first pressurizing equalization step may comprise counter-currently introducing the pressure equalization gas from the adsorption bed undergoing the first depressurizing equalization step into the adsorption bed undergoing the first pressurizing equalization step.

The second pressurizing equalization step may comprise counter-currently introducing the pressure equalization gas from the adsorption bed undergoing the second depressurizing equalization step into the adsorption bed undergoing the second pressurizing equalization step.

The third pressurizing equalization step may comprise counter-currently introducing the pressure equalization gas from the adsorption bed undergoing the third depressurizing equalization step into the adsorption bed undergoing the third pressurizing equalization step.

The fourth pressurizing equalization step may comprise counter-currently introducing the pressure equalization gas from the adsorption bed undergoing the fourth depressurizing equalization step into the adsorption bed undergoing the fourth pressurizing equalization step.

The fifth pressurizing equalization step may comprise counter-currently introducing the pressure equalization gas from the adsorption bed undergoing the fifth depressurizing equalization step into the adsorption bed undergoing the fifth pressurizing equalization step.

The repressurization step may comprise increasing the pressure in an adsorption bed undergoing the repressurization step until the adsorption bed undergoing the repressurization step is substantially at the feed gas pressure, by at least one of co-currently introducing the feed gas mixture into the adsorption bed undergoing the repressurization step, and counter-currently introducing a portion of the product gas from the adsorption bed undergoing the production step into the adsorption bed undergoing the repressurization step.

The fifth depressurizing equalization step may comprise passing a second portion of the effluent gas from the adsorption bed undergoing the fifth depressurizing equalization step to at least one of the adsorption beds undergoing the purge step as the purge gas from the adsorption bed undergoing the fifth depressurizing equalization step when the purge step comprises counter-currently introducing the purge gas from the adsorption bed undergoing the fifth depressurizing equalization step.

The duration of the production step may be 23% to 27% of the cycle time of the first repetitive cycle or the duration of the purge step may be 23% to 27% of the cycle time of the first repetitive cycle when the adsorption beds are subjected to the first repetitive cycle.

The duration of the purge step may be 23% to 27% of the cycle time of the second repetitive cycle when the adsorption beds are subjected to the second repetitive cycle.

The first pressurizing equalization step may further comprise at least one of (i) co-currently introducing the feed gas mixture into the adsorption bed undergoing the first pressurizing equalization step simultaneous with the counter-current introduction of the pressure equalization gas from the adsorption bed undergoing the first depressurizing equalization bed, and (ii) counter-currently introducing product gas from at least one of the adsorption beds undergoing the feed step into the adsorption bed undergoing the first pressurizing equalization step simultaneous with the counter-current introduction of the pressure equalization gas from the adsorption bed undergoing the first depressurizing equalization bed.

The purge step may comprise counter-currently introducing the purge gas from the adsorption bed undergoing the fifth depressurizing equalization step into the adsorption bed undergoing the purge step and the fifth depressurizing equalization step may further comprise passing a second portion of the effluent gas from the adsorption bed undergoing the fifth depressurizing equalization step to at least one of the adsorption beds undergoing the purge step as the purge gas.

The invention claimed is:

1. A process for separating a primary gas component from a feed gas mixture comprising the primary gas component and secondary gas components in a plurality of twelve adsorption beds, each adsorption bed containing an adsorbent selective for the secondary gas components, the process comprising subjecting each of the plurality of adsorption beds to at least one of a first repetitive cycle and a second repetitive cycle, the first repetitive cycle comprising, in sequence, (a) a production step or hybrid step thereof, (b) a plurality of five depressurizing equalization steps, (c) a supply purge gas step, (d) a blowdown step, (e) a purge step, (f) a plurality of five pressurizing equalization steps, and (g) a repressurization step, and the second repetitive cycle comprising, in sequence, (a) a production step or hybrid step thereof, (b) a plurality of five depressurizing equalization steps, (c/d) a hybrid supply purge gas/blowdown step, (e) a purge step, (f) a plurality of five pressurizing equalization steps, and (g) a repressurization step;
   wherein no effluent from the blowdown step and no effluent from the purge step is recycled to the plurality of twelve adsorption beds as rinse gas;
   wherein the plurality of five depressurizing equalization steps (b) comprises, in sequence, a first depressurizing equalization step, a second depressurizing equalization step, a third depressurizing equalization step, a fourth depressurizing equalization step, and a fifth pressure decreasing equalization step;
   wherein the plurality of five pressurizing equalization steps (f) comprises, in sequence, a fifth pressurizing equalization step, a fourth pressurizing equalization step, a third pressurizing equalization step, a second pressurizing equalization step, and a first pressurizing equalization step;
   wherein the fifth depressurizing equalization step comprises co-currently withdrawing an effluent gas from an adsorption bed undergoing the fifth depressurizing equalization step, and passing at least a portion of the effluent gas from the adsorption bed undergoing the fifth depressurizing equalization step as pressure equalization gas to an adsorption bed undergoing the fifth pressurizing equalization step thereby equalizing the pressure between the adsorption bed undergoing the fifth depressurizing equalization step and the adsorption bed undergoing the fifth pressurizing equalization step; and
   wherein the purge step (e) comprises counter-currently introducing the purge gas from the adsorption bed undergoing the fifth depressurizing equalization step into the adsorption bed undergoing the purge step and the fifth depressurizing equalization step further comprises passing a second portion of the effluent gas from the adsorption bed undergoing the fifth depressurizing equalization step to at least one of the adsorption beds undergoing the purge step as the purge gas.

2. The process of claim 1 wherein:
   the first repetitive cycle has a cycle time to execute one complete cycle of the first repetitive cycle and the second repetitive cycle has a cycle time to execute one complete cycle of the second repetitive cycle;
   the production step or hybrid step thereof (a) comprises introducing the feed gas mixture at a feed gas pressure ranging from 1.0 MPa to 7.0 MPa into an adsorption bed undergoing the production step or hybrid step thereof and adsorbing the secondary gas components on the adsorbent in the adsorption bed undergoing the production step or hybrid step thereof while simultaneously withdrawing a product gas from the adsorption bed undergoing the production step or hybrid step thereof;
   the first depressurizing equalization step comprises co-currently withdrawing a pressure equalization gas from an adsorption bed undergoing the first depressurizing equalization step, and passing the pressure equalization gas to an adsorption bed undergoing a first pressurizing equalization step thereby equalizing the pressure between the adsorption bed undergoing the first depressurizing equalization step and the adsorption bed undergoing the first pressurizing equalization step;
   the second depressurizing equalization step comprises co-currently withdrawing a pressure equalization gas from an adsorption bed undergoing the second depressurizing equalization step, and passing the pressure equalization gas from the adsorption bed undergoing the second depressurizing equalization step to an adsorption bed undergoing a second pressurizing equalization step thereby equalizing the pressure between the adsorption bed undergoing the second depressurizing equalization step and the adsorption bed undergoing the second pressurizing equalization step;

the third depressurizing equalization step comprises co-currently withdrawing a pressure equalization gas from an adsorption bed undergoing the third depressurizing equalization step, and passing the pressure equalization gas from the adsorption bed undergoing the third depressurizing equalization step to an adsorption bed undergoing a third pressurizing equalization step thereby equalizing the pressure between the adsorption bed undergoing the third depressurizing equalization step and the adsorption bed undergoing the third pressurizing equalization step;

the fourth depressurizing equalization step comprises co-currently withdrawing a pressure equalization gas from an adsorption bed undergoing the fourth depressurizing equalization step, and passing the pressure equalization gas from the adsorption bed undergoing the fourth depressurizing equalization step to an adsorption bed undergoing a fourth pressurizing equalization step thereby equalizing the pressure between the adsorption bed undergoing the fourth depressurizing equalization step and the adsorption bed undergoing the fourth pressurizing equalization step;

the supply purge gas step (c) comprises co-currently withdrawing a purge gas from an adsorption bed undergoing the supply purge step, and passing the purge gas from the adsorption bed undergoing the supply purge step to the adsorption beds undergoing the purge step;

the blowdown step (d) comprises counter-currently withdrawing a blowdown gas from an adsorption bed undergoing the blowdown step, the blowdown gas having a concentration of the primary gas component that is lower than the concentration of the primary gas component in the feed gas mixture;

the hybrid supply purge gas/blowdown step (c/d) comprises co-currently withdrawing a purge gas from an adsorption bed undergoing the hybrid supply purge gas/blowdown step, and passing the purge gas from the adsorption bed undergoing the hybrid supply purge gas/blowdown step to an adsorption bed undergoing the purge step while simultaneously counter-currently withdrawing a blowdown gas from the adsorption bed undergoing the hybrid supply purge gas/blowdown step, the blowdown gas having a concentration of the primary gas component that is lower than the concentration of the primary gas component in the feed gas mixture;

the purge step (e) further comprises counter-currently introducing at least one of (i) the purge gas from the adsorption bed undergoing the supply purge step, and (ii) the purge gas from the hybrid supply purge gas/blowdown step into an adsorption bed undergoing the purge step and counter-currently withdrawing a purge gas effluent from the adsorption bed undergoing the purge step, the purge gas effluent having a concentration of the secondary gas components that is higher than the concentration of the secondary gas components in the feed gas mixture;

the first pressurizing equalization step comprises counter-currently introducing the pressure equalization gas from the adsorption bed undergoing the first depressurizing equalization step into the adsorption bed undergoing the first pressurizing equalization step;

the second pressurizing equalization step comprises counter-currently introducing the pressure equalization gas from the adsorption bed undergoing the second depressurizing equalization step into the adsorption bed undergoing the second pressurizing equalization step;

the third pressurizing equalization step comprises counter-currently introducing the pressure equalization gas from the adsorption bed undergoing the third depressurizing equalization step into the adsorption bed undergoing the third pressurizing equalization step;

the fourth pressurizing equalization step comprises counter-currently introducing the pressure equalization gas from the adsorption bed undergoing the fourth depressurizing equalization step into the adsorption bed undergoing the fourth pressurizing equalization step; and the fifth pressurizing equalization step comprises counter-currently introducing the pressure equalization gas from the adsorption bed undergoing the fifth depressurizing equalization step into the adsorption bed undergoing the fifth pressurizing equalization step; and the repressurization step (g) comprises increasing the pressure in an adsorption bed undergoing the repressurization step until the adsorption bed undergoing the repressurization step is substantially at the feed gas pressure, by at least one of (g1) co-currently introducing the feed gas mixture into the adsorption bed undergoing the repressurization step, and (g2) counter-currently introducing a portion of the product gas from the adsorption bed undergoing the production step into the adsorption bed undergoing the repressurization step;

wherein the fifth depressurizing equalization step comprises passing a second portion of the effluent gas from the adsorption bed undergoing the fifth depressurizing equalization step to at least one of the adsorption beds undergoing the purge step as the purge gas from the adsorption bed undergoing the fifth depressurizing equalization step when the purge step comprises counter-currently introducing the purge gas from the adsorption bed undergoing the fifth depressurizing equalization step.

3. The process of claim 1 wherein:
(i) the duration of the production step is 23% to 27% of the cycle time of the first repetitive cycle or the duration of the purge step is 23% to 27% of the cycle time of the first repetitive cycle when the adsorption beds are subjected to the first repetitive cycle; and
(ii) the duration of the purge step is 23% to 27% of the cycle time of the second repetitive cycle when the adsorption beds are subjected to the second repetitive cycle.

4. The process of claim 1 wherein the primary gas component is $H_2$ and the secondary gas components comprise at least two of CO, $CO_2$, $CH_4$, and $N_2$.

5. The process of claim 1 wherein the first pressurizing equalization step further comprises at least one of (i) co-currently introducing the feed gas mixture into the adsorption bed undergoing the first pressurizing equalization step simultaneous with the counter-current introduction of the pressure equalization gas from the adsorption bed undergoing the first depressurizing equalization bed, and (ii) counter-currently introducing product gas from at least one of the adsorption beds undergoing the feed step into the adsorption bed undergoing the first pressurizing equalization step simultaneous with the counter-current introduction of the pressure equalization gas from the adsorption bed undergoing the first depressurizing equalization bed.

6. The process of claim 1 wherein the process comprises subjecting each of the plurality of adsorption beds to the first repetitive cycle.

7. The process of claim 6 wherein the first repetitive cycle further comprises an idle step between the fifth depressurizing equalization step of the plurality of five depressurizing equalization steps and the supply purge gas step.

8. The process of claim 1 wherein the process comprises subjecting each of the plurality of adsorption beds to the second repetitive cycle.

9. The process of claim 8 wherein the second repetitive cycle further comprises an idle step between the fifth depressurizing equalization step of the plurality of five depressurizing equalization steps and the hybrid supply purge gas/blowdown step.

10. The process of claim 1 wherein at least one of the plurality of five depressurizing equalization steps is a parallel depressurizing equalization step and at least one of the plurality of five pressurizing equalization steps is a parallel pressurizing equalization step.

11. The process of claim 1 wherein at least one of the plurality of five pressurizing equalization steps is a hybrid pressurizing equalization/feed pressurization step.

12. The process of claim 1 wherein at least one of the plurality of five pressurizing equalization steps is a hybrid pressurizing equalization/product pressurization step.

* * * * *